United States Patent
Khemani et al.

(10) Patent No.: US 8,739,274 B2
(45) Date of Patent: May 27, 2014

(54) METHOD AND DEVICE FOR PERFORMING INTEGRATED CACHING IN A DATA COMMUNICATION NETWORK

(75) Inventors: Prakash Khemani, Bangalore (IN); Prabakar Sundarrajan, Saratoga, CA (US); Lakshmi Kumar, Bangalore (IN); Kailash Kailash, San Jose, CA (US); Ajay Soni, San Jose, CA (US); Rajiv Sinha, San Jose, CA (US); Saravanakumar Annamalaisami, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 11 days.

(21) Appl. No.: 11/169,002

(22) Filed: Jun. 29, 2005

(65) Prior Publication Data

US 2006/0015570 A1    Jan. 19, 2006

Related U.S. Application Data

(60) Provisional application No. 60/583,784, filed on Jun. 30, 2004.

(51) Int. Cl.
*G06F 15/16* (2006.01)

(52) U.S. Cl.
USPC ......... 726/14; 726/15; 726/21; 713/151; 713/152; 713/164; 713/166; 713/189; 713/150; 709/218; 709/219; 711/113; 711/118; 711/217

(58) Field of Classification Search
USPC ........ 726/14–15, 21; 713/151–152, 164, 166, 713/189, 150; 709/217, 218–219; 711/118, 711/113
See application file for complete search history.

(56) References Cited

U.S. PATENT DOCUMENTS

| 4,479,195 A | 10/1984 | Herr et al. |
| 4,701,844 A | 10/1987 | Thompson et al. |

(Continued)

FOREIGN PATENT DOCUMENTS

| CN | 1394042 | 1/2003 |
| CN | 1410905 A | 4/2003 |

(Continued)

OTHER PUBLICATIONS

Krishnamurthy B.C. et al., "Key differences between HTTP/1.0 and HTTP/1.1," Computer Networks, Elsevier Science Publishers B.V., vol. 31, No. 11-16, pp. 1737-1751, May 1999.

(Continued)

*Primary Examiner* — Edan Orgad
*Assistant Examiner* — Canh Le
(74) *Attorney, Agent, or Firm* — Foley & Lardner LLP; Christopher J. McKenna

(57) ABSTRACT

A device that implements a method for performing integrated caching in a data communication network. The device is configured to receive a packet from a client over the data communication network, wherein the packet includes a request for an object. At the operating system/kernel level of the device, one or more of decryption processing of the packet, authentication and/or authorization of the client, and decompression of the request occurs prior to and integrated with caching operations. The caching operations include determining if the object resides within a cache, serving the request from the cache in response to a determination that the object is stored within the cache, and sending the request to a server in response to a determination that the object is not stored within the cache.

21 Claims, 4 Drawing Sheets

(56) References Cited

U.S. PATENT DOCUMENTS

| | | | |
|---|---|---|---|
| 4,885,680 A | 12/1989 | Anthony et al. | |
| 4,935,870 A | 6/1990 | Burk, Jr. et al. | |
| 5,301,270 A | 4/1994 | Steinberg et al. | |
| 5,307,413 A | 4/1994 | Denzer | |
| 5,329,619 A | 7/1994 | Page et al. | |
| 5,359,712 A | 10/1994 | Cohen et al. | |
| 5,511,208 A * | 4/1996 | Boyles et al. | 709/223 |
| 5,519,699 A | 5/1996 | Ohsawa | |
| 5,521,940 A | 5/1996 | Lane et al. | |
| 5,561,769 A | 10/1996 | Kumar et al. | |
| 5,623,492 A | 4/1997 | Teraslinna | |
| 5,625,793 A | 4/1997 | Mirza | |
| 5,657,390 A * | 8/1997 | Elgamal et al. | 713/151 |
| 5,671,226 A | 9/1997 | Murakami et al. | |
| 5,708,656 A | 1/1998 | Noneman et al. | |
| 5,742,829 A | 4/1998 | Davis et al. | |
| 5,758,085 A | 5/1998 | Kouoheris et al. | |
| 5,758,110 A | 5/1998 | Boss et al. | |
| 5,761,431 A | 6/1998 | Gross et al. | |
| 5,787,470 A | 7/1998 | DeSimone et al. | |
| 5,812,668 A | 9/1998 | Weber | |
| 5,815,462 A | 9/1998 | Konishi et al. | |
| 5,819,020 A | 10/1998 | Beeler, Jr. | |
| 5,822,524 A | 10/1998 | Chen et al. | |
| 5,828,840 A | 10/1998 | Cowan et al. | |
| 5,835,726 A | 11/1998 | Shwed et al. | |
| 5,838,920 A | 11/1998 | Rosborough | |
| 5,850,446 A | 12/1998 | Berger et al. | |
| 5,852,717 A | 12/1998 | Bhide et al. | |
| 5,864,837 A * | 1/1999 | Maimone | 707/1 |
| 5,881,229 A | 3/1999 | Singh et al. | |
| 5,889,863 A | 3/1999 | Weber | |
| 5,893,150 A | 4/1999 | Hagersten et al. | |
| 5,911,051 A | 6/1999 | Carson et al. | |
| 5,918,244 A | 6/1999 | Percival | |
| 5,925,100 A * | 7/1999 | Drewry et al. | 709/219 |
| 5,931,917 A | 8/1999 | Nguyen et al. | |
| 5,931,961 A | 8/1999 | Ranganathan et al. | |
| 5,933,605 A | 8/1999 | Kawano et al. | |
| 5,940,074 A | 8/1999 | Britt et al. | |
| 5,940,516 A | 8/1999 | Mason et al. | |
| 5,943,424 A | 8/1999 | Berger et al. | |
| 5,956,483 A | 9/1999 | Grate et al. | |
| 5,958,016 A | 9/1999 | Chang et al. | |
| 5,978,840 A | 11/1999 | Nguyen et al. | |
| 5,983,208 A | 11/1999 | Haller et al. | |
| 5,987,132 A | 11/1999 | Rowney | |
| 5,987,482 A | 11/1999 | Bates et al. | |
| 5,987,611 A | 11/1999 | Freund | |
| 5,995,999 A | 11/1999 | Bharadhwaj | |
| 5,996,076 A | 11/1999 | Rowney et al. | |
| 5,999,179 A | 12/1999 | Kekic et al. | |
| 5,999,525 A | 12/1999 | Krishnaswamy et al. | |
| 6,002,767 A | 12/1999 | Kramer | |
| 6,021,470 A * | 2/2000 | Frank et al. | 711/138 |
| 6,023,724 A | 2/2000 | Bhatia et al. | |
| 6,026,379 A | 2/2000 | Haller et al. | |
| 6,026,413 A | 2/2000 | Challenger et al. | |
| 6,026,440 A | 2/2000 | Shrader et al. | |
| 6,029,175 A | 2/2000 | Chow et al. | |
| 6,058,250 A | 5/2000 | Harwood et al. | |
| 6,061,715 A | 5/2000 | Hawes | |
| 6,061,769 A | 5/2000 | Kapulka et al. | |
| 6,061,796 A | 5/2000 | Chen et al. | |
| 6,067,569 A | 5/2000 | Khaki et al. | |
| 6,072,870 A | 6/2000 | Nguyen et al. | |
| 6,092,155 A | 7/2000 | Olnowich | |
| 6,101,543 A | 8/2000 | Alden et al. | |
| 6,112,085 A | 8/2000 | Garner et al. | |
| 6,119,105 A | 9/2000 | Williams | |
| 6,119,151 A * | 9/2000 | Cantrell et al. | 709/216 |
| 6,122,403 A | 9/2000 | Rhoads | |
| 6,128,627 A | 10/2000 | Mattis et al. | |
| 6,131,120 A | 10/2000 | Reid | |
| 6,141,686 A | 10/2000 | Jackowski et al. | |
| 6,144,775 A | 11/2000 | Williams et al. | |
| 6,157,955 A | 12/2000 | Narad et al. | |
| 6,161,123 A | 12/2000 | Renouard et al. | |
| 6,163,772 A | 12/2000 | Kramer et al. | |
| 6,170,017 B1 | 1/2001 | Dias et al. | |
| 6,173,325 B1 | 1/2001 | Kukreja | |
| 6,175,869 B1 | 1/2001 | Ahuja et al. | |
| 6,178,409 B1 | 1/2001 | Weber et al. | |
| 6,182,139 B1 | 1/2001 | Brendel | |
| 6,192,408 B1 * | 2/2001 | Vahalia et al. | 709/229 |
| 6,219,669 B1 | 4/2001 | Haff et al. | |
| 6,233,249 B1 | 5/2001 | Katseff et al. | |
| 6,233,606 B1 | 5/2001 | Dujari | |
| 6,233,619 B1 | 5/2001 | Narisi et al. | |
| 6,236,652 B1 | 5/2001 | Preston et al. | |
| 6,252,851 B1 | 6/2001 | Siu et al. | |
| 6,253,027 B1 | 6/2001 | Weber et al. | |
| 6,253,188 B1 | 6/2001 | Witek et al. | |
| 6,253,327 B1 | 6/2001 | Zhang et al. | |
| 6,256,773 B1 | 7/2001 | Bowman-Amuah | |
| 6,272,146 B1 | 8/2001 | Bowater et al. | |
| 6,272,148 B1 | 8/2001 | Takagi et al. | |
| 6,272,556 B1 | 8/2001 | Gish | |
| 6,282,172 B1 | 8/2001 | Robles et al. | |
| 6,289,382 B1 | 9/2001 | Bowman-Amuah | |
| 6,289,450 B1 | 9/2001 | Pensak et al. | |
| 6,301,249 B1 | 10/2001 | Mansfield et al. | |
| 6,304,915 B1 | 10/2001 | Nguyen et al. | |
| 6,308,273 B1 | 10/2001 | Goertzel et al. | |
| 6,321,235 B1 | 11/2001 | Bird et al. | |
| 6,321,337 B1 | 11/2001 | Reshef et al. | |
| 6,324,525 B1 | 11/2001 | Kramer et al. | |
| 6,324,582 B1 | 11/2001 | Sridhar et al. | |
| 6,324,647 B1 | 11/2001 | Bowman-Amuah | |
| 6,324,648 B1 * | 11/2001 | Grantges, Jr. | 726/12 |
| 6,327,242 B1 | 12/2001 | Amicangioli et al. | |
| 6,332,163 B1 | 12/2001 | Bowman-Amuah | |
| 6,333,931 B1 | 12/2001 | LaPier et al. | |
| 6,334,664 B1 | 1/2002 | Silverbrook | |
| 6,339,832 B1 | 1/2002 | Bowman-Amuah | |
| 6,345,239 B1 | 2/2002 | Bowman-Amuah | |
| 6,363,363 B1 | 3/2002 | Haller et al. | |
| 6,363,478 B1 * | 3/2002 | Lambert et al. | 713/151 |
| 6,370,573 B1 | 4/2002 | Bowman-Amuah | |
| 6,370,599 B1 | 4/2002 | Anand et al. | |
| 6,373,950 B1 | 4/2002 | Rowney | |
| 6,383,478 B1 | 5/2002 | Prokop et al. | |
| 6,389,462 B1 * | 5/2002 | Cohen et al. | 709/218 |
| 6,389,505 B1 | 5/2002 | Emma et al. | |
| 6,398,359 B1 | 6/2002 | Silverbrook et al. | |
| 6,405,364 B1 | 6/2002 | Bowman-Amuah | |
| 6,412,000 B1 | 6/2002 | Riddle et al. | |
| 6,415,329 B1 | 7/2002 | Gelman et al. | |
| 6,427,132 B1 | 7/2002 | Bowman-Amuah | |
| 6,427,187 B2 | 7/2002 | Malcolm | |
| 6,431,777 B1 | 8/2002 | Silverbrook | |
| 6,434,568 B1 | 8/2002 | Bowman-Amuah | |
| 6,434,618 B1 | 8/2002 | Cohen et al. | |
| 6,434,628 B1 | 8/2002 | Bowman-Amuah | |
| 6,438,127 B1 | 8/2002 | Le Goff et al. | |
| 6,438,594 B1 | 8/2002 | Bowman-Amuah | |
| 6,442,571 B1 | 8/2002 | Haff et al. | |
| 6,442,682 B1 | 8/2002 | Pothapragada et al. | |
| 6,442,748 B1 | 8/2002 | Bowman-Amuah | |
| 6,447,113 B1 | 9/2002 | Silverbrook et al. | |
| 6,449,658 B1 | 9/2002 | Lafe et al. | |
| 6,449,695 B1 | 9/2002 | Bereznyi et al. | |
| 6,452,915 B1 | 9/2002 | Jorgensen | |
| 6,452,923 B1 | 9/2002 | Gerszberg et al. | |
| 6,457,103 B1 | 9/2002 | Challenger et al. | |
| 6,473,794 B1 | 10/2002 | Guheen et al. | |
| 6,473,802 B2 | 10/2002 | Masters | |
| 6,477,580 B1 | 11/2002 | Bowman-Amuah | |
| 6,477,665 B1 | 11/2002 | Bowman-Amuah | |
| 6,484,143 B1 | 11/2002 | Swildens et al. | |
| 6,484,206 B2 | 11/2002 | Crump et al. | |
| 6,487,641 B1 | 11/2002 | Cusson et al. | |
| 6,496,481 B1 | 12/2002 | Wu et al. | |
| 6,496,776 B1 | 12/2002 | Blumberg et al. | |

(56) References Cited

U.S. PATENT DOCUMENTS

| | | | |
|---|---|---|---|
| 6,496,850 B1 | 12/2002 | Bowman-Amuah | |
| 6,496,935 B1 | 12/2002 | Fink et al. | |
| 6,502,102 B1 | 12/2002 | Haswell et al. | |
| 6,502,192 B1 | 12/2002 | Nguyen | |
| 6,502,213 B1 | 12/2002 | Bowman-Amuah | |
| 6,507,891 B1 | 1/2003 | Challenger et al. | |
| 6,519,571 B1 | 2/2003 | Guheen et al. | |
| 6,523,027 B1 | 2/2003 | Underwood | |
| 6,529,909 B1 | 3/2003 | Bowman-Amuah | |
| 6,529,948 B1 | 3/2003 | Bowman-Amuah | |
| 6,536,037 B1 | 3/2003 | Guheen et al. | |
| 6,539,396 B1 | 3/2003 | Bowman-Amuah | |
| 6,549,949 B1 | 4/2003 | Bowman-Amuah | |
| 6,550,012 B1 | 4/2003 | Villa et al. | |
| 6,550,057 B1 | 4/2003 | Bowman-Amuah | |
| 6,553,129 B1 | 4/2003 | Rhoads | |
| 6,553,377 B1 | 4/2003 | Eschelbeck et al. | |
| 6,553,409 B1 | 4/2003 | Zhang et al. | |
| 6,571,282 B1 | 5/2003 | Bowman-Amuah | |
| 6,574,668 B1 | 6/2003 | Gubbi et al. | |
| 6,574,688 B1 | 6/2003 | Dale et al. | |
| 6,578,068 B1 | 6/2003 | Bowman-Amuah | |
| 6,578,073 B1 | 6/2003 | Starnes et al. | |
| 6,584,569 B2 | 6/2003 | Reshef et al. | |
| 6,590,588 B2 | 7/2003 | Lincke et al. | |
| 6,591,266 B1 | 7/2003 | Li et al. | |
| 6,594,690 B2 | 7/2003 | Cantwell | |
| 6,598,075 B1 | 7/2003 | Ogdon et al. | |
| 6,601,057 B1 | 7/2003 | Underwood et al. | |
| 6,601,192 B1 | 7/2003 | Bowman-Amuah | |
| 6,601,233 B1 | 7/2003 | Underwood | |
| 6,601,234 B1 | 7/2003 | Bowman-Amuah | |
| 6,606,660 B1 | 8/2003 | Bowman-Amuah | |
| 6,606,663 B1 | 8/2003 | Liao et al. | |
| 6,606,744 B1 | 8/2003 | Mikurak | |
| 6,609,128 B1 | 8/2003 | Underwood | |
| 6,611,262 B1 | 8/2003 | Suzuki | |
| 6,611,522 B1 | 8/2003 | Zheng et al. | |
| 6,611,822 B1 | 8/2003 | Beams et al. | |
| 6,611,867 B1 | 8/2003 | Bowman-Amuah | |
| 6,614,800 B1 | 9/2003 | Genty et al. | |
| 6,615,166 B1 | 9/2003 | Guheen et al. | |
| 6,615,199 B1 | 9/2003 | Bowman-Amuah | |
| 6,615,253 B1 | 9/2003 | Bowman-Amuah | |
| 6,618,359 B1 | 9/2003 | Chen et al. | |
| 6,629,081 B1 | 9/2003 | Cornelius et al. | |
| 6,631,986 B2 | 10/2003 | Silverbrook | |
| 6,633,574 B1 | 10/2003 | Koch et al. | |
| 6,633,878 B1 | 10/2003 | Underwood | |
| 6,636,242 B2 | 10/2003 | Bowman-Amuah | |
| 6,640,238 B1 | 10/2003 | Bowman-Amuah | |
| 6,640,240 B1 | 10/2003 | Hoffman et al. | |
| 6,640,244 B1 | 10/2003 | Bowman-Amuah | |
| 6,640,248 B1 | 10/2003 | Jorgensen | |
| 6,640,249 B1 | 10/2003 | Bowman-Amuah | |
| 6,647,130 B2 | 11/2003 | Rhoads | |
| 6,650,640 B1 | 11/2003 | Muller et al. | |
| 6,652,089 B2 | 11/2003 | Silverbrook | |
| 6,652,090 B2 | 11/2003 | Silverbrook | |
| 6,662,221 B1 | 12/2003 | Gonda et al. | |
| 6,662,357 B1 | 12/2003 | Bowman-Amuah | |
| 6,664,978 B1 | 12/2003 | Kekic et al. | |
| 6,671,818 B1 | 12/2003 | Mikurak | |
| 6,678,734 B1 | 1/2004 | Haatainen et al. | |
| 6,681,029 B1 | 1/2004 | Rhoads | |
| 6,687,732 B1 | 2/2004 | Bector et al. | |
| 6,691,227 B1 | 2/2004 | Gopal et al. | |
| 6,697,824 B1 | 2/2004 | Bowman-Amuah | |
| 6,697,844 B1 * | 2/2004 | Chan et al. | 709/206 |
| 6,697,849 B1 * | 2/2004 | Carlson | 709/219 |
| 6,700,902 B1 | 3/2004 | Meyer | |
| 6,701,345 B1 | 3/2004 | Carley et al. | |
| 6,701,514 B1 | 3/2004 | Haswell et al. | |
| 6,704,873 B1 | 3/2004 | Underwood | |
| 6,715,145 B1 | 3/2004 | Bowman-Amuah | |
| 6,718,535 B1 | 4/2004 | Underwood | |
| 6,721,713 B1 | 4/2004 | Guheen et al. | |
| 6,728,787 B1 | 4/2004 | Leigh | |
| 6,732,237 B1 * | 5/2004 | Jacobs et al. | 711/119 |
| 6,732,269 B1 * | 5/2004 | Baskey et al. | 713/153 |
| 6,732,314 B1 | 5/2004 | Borella et al. | |
| 6,735,601 B1 | 5/2004 | Subrahmanyam | |
| 6,735,691 B1 | 5/2004 | Capps et al. | |
| 6,742,015 B1 | 5/2004 | Bowman-Amuah | |
| 6,744,774 B2 | 6/2004 | Sharma | |
| 6,754,699 B2 | 6/2004 | Swildens et al. | |
| 6,760,748 B1 | 7/2004 | Hakim | |
| 6,763,467 B1 | 7/2004 | Radatti et al. | |
| 6,766,373 B1 | 7/2004 | Beadle et al. | |
| 6,772,203 B1 | 8/2004 | Feiertag et al. | |
| 6,775,392 B1 | 8/2004 | Rhoads | |
| 6,785,719 B1 * | 8/2004 | Jacobson et al. | 709/219 |
| 6,788,315 B1 | 9/2004 | Kekic et al. | |
| 6,789,170 B1 | 9/2004 | Jacobs et al. | |
| 6,792,615 B1 | 9/2004 | Rowe et al. | |
| 6,801,927 B1 | 10/2004 | Smith et al. | |
| 6,802,020 B1 | 10/2004 | Smith | |
| 6,807,607 B1 | 10/2004 | Lamparter | |
| 6,820,125 B1 | 11/2004 | Dias et al. | |
| 6,820,133 B1 | 11/2004 | Grove et al. | |
| 6,820,974 B2 | 11/2004 | Silverbrook | |
| 6,823,374 B2 | 11/2004 | Kausik et al. | |
| 6,826,626 B1 | 11/2004 | McManus | |
| 6,826,627 B2 | 11/2004 | Sjollema et al. | |
| 6,831,898 B1 | 12/2004 | Edsall et al. | |
| 6,842,906 B1 | 1/2005 | Bowman-Amuah | |
| 6,847,892 B2 | 1/2005 | Zhou et al. | |
| 6,850,252 B1 | 2/2005 | Hoffberg | |
| 6,870,921 B1 | 3/2005 | Elsey et al. | |
| 6,873,988 B2 | 3/2005 | Herrmann et al. | |
| 6,880,086 B2 | 4/2005 | Kidder et al. | |
| 6,883,068 B2 | 4/2005 | Tsirigotis et al. | |
| 6,888,927 B1 | 5/2005 | Cruickshank et al. | |
| 6,894,981 B1 | 5/2005 | Coile et al. | |
| 6,899,420 B2 | 5/2005 | Silverbrook | |
| 6,901,072 B1 | 5/2005 | Wong | |
| 6,904,449 B1 | 6/2005 | Quinones | |
| 6,904,519 B2 | 6/2005 | Anand et al. | |
| 6,907,546 B1 | 6/2005 | Haswell et al. | |
| 6,910,074 B1 | 6/2005 | Amin et al. | |
| 6,912,522 B2 | 6/2005 | Edgar | |
| 6,918,113 B2 | 7/2005 | Patel et al. | |
| 6,918,665 B2 | 7/2005 | Silverbrook | |
| 6,920,502 B2 | 7/2005 | Araujo et al. | |
| 6,925,495 B2 | 8/2005 | Hegde et al. | |
| 6,934,288 B2 | 8/2005 | Dempo | |
| 6,935,736 B2 | 8/2005 | Silverbrook | |
| 6,944,279 B2 | 9/2005 | Elsey et al. | |
| 6,954,736 B2 | 10/2005 | Menninger et al. | |
| 6,954,877 B2 | 10/2005 | Earl et al. | |
| 6,957,186 B1 | 10/2005 | Guheen et al. | |
| 6,957,249 B2 | 10/2005 | Salo et al. | |
| 6,959,320 B2 | 10/2005 | Shah et al. | |
| 6,974,928 B2 | 12/2005 | Bloom | |
| 6,976,090 B2 | 12/2005 | Ben-Shaul et al. | |
| 6,980,962 B1 | 12/2005 | Arganbright et al. | |
| 6,990,070 B1 | 1/2006 | Aweya et al. | |
| 6,990,480 B1 | 1/2006 | Burt | |
| 6,993,016 B1 | 1/2006 | Liva et al. | |
| 6,996,628 B2 | 2/2006 | Keane et al. | |
| 6,996,631 B1 | 2/2006 | Aiken et al. | |
| 7,000,012 B2 | 2/2006 | Moore et al. | |
| 7,007,092 B2 | 2/2006 | Peiffer | |
| 7,007,103 B2 | 2/2006 | Pinkerton et al. | |
| 7,010,300 B1 | 3/2006 | Jones et al. | |
| 7,013,290 B2 | 3/2006 | Ananian | |
| 7,016,055 B2 | 3/2006 | Dodge et al. | |
| 7,020,719 B1 | 3/2006 | Grove et al. | |
| 7,023,979 B1 | 4/2006 | Wu et al. | |
| 7,024,452 B1 | 4/2006 | O'Connell et al. | |
| 7,026,954 B2 | 4/2006 | Slemmer et al. | |
| 7,027,055 B2 | 4/2006 | Anderson et al. | |
| 7,028,083 B2 | 4/2006 | Levine et al. | |
| 7,028,333 B2 | 4/2006 | Tuomenoksa et al. | |

(56) References Cited

U.S. PATENT DOCUMENTS

| | | |
|---|---|---|
| 7,028,334 B2 | 4/2006 | Tuomenoksa |
| 7,031,314 B2 | 4/2006 | Craig et al. |
| 7,034,691 B1 | 4/2006 | Rapaport et al. |
| 7,035,427 B2 | 4/2006 | Rhoads |
| 7,036,142 B1 | 4/2006 | Zhang et al. |
| 7,039,606 B2 | 5/2006 | Hoffman et al. |
| 7,039,708 B1 | 5/2006 | Knobl et al. |
| 7,042,879 B2 | 5/2006 | Eschbach et al. |
| 7,043,529 B1 | 5/2006 | Simonoff |
| 7,047,279 B1 | 5/2006 | Beams et al. |
| 7,047,424 B2 | 5/2006 | Bendinelli et al. |
| 7,051,161 B2 | 5/2006 | Dixit et al. |
| 7,051,316 B2 | 5/2006 | Charisius et al. |
| 7,054,837 B2 | 5/2006 | Hoffman et al. |
| 7,054,944 B2 | 5/2006 | Tang et al. |
| 7,055,028 B2 | 5/2006 | Peiffer et al. |
| 7,055,169 B2 | 5/2006 | Delpuch et al. |
| 7,055,947 B2 | 6/2006 | Silverbrook |
| 7,057,759 B2 | 6/2006 | Lapstun et al. |
| 7,069,234 B1 | 6/2006 | Cornelius et al. |
| 7,070,110 B2 | 7/2006 | Lapstun et al. |
| 7,072,665 B1 | 7/2006 | Blumberg et al. |
| 7,072,843 B2 | 7/2006 | Menninger et al. |
| 7,072,965 B2 | 7/2006 | Ryuutou et al. |
| 7,080,041 B2 | 7/2006 | Nagel |
| 7,082,409 B1 | 7/2006 | Cherry |
| 7,085,683 B2 | 8/2006 | Anderson et al. |
| 7,085,834 B2 | 8/2006 | Delany et al. |
| 7,085,854 B2 | 8/2006 | Keane et al. |
| 7,086,728 B2 | 8/2006 | Silverbrook |
| 7,092,370 B2 | 8/2006 | Jiang et al. |
| 7,096,009 B2 | 8/2006 | Mousseau et al. |
| 7,096,418 B1 | 8/2006 | Singhal et al. |
| 7,096,495 B1 | 8/2006 | Warrier et al. |
| 7,097,106 B2 | 8/2006 | Silverbrook et al. |
| 7,100,195 B2 | 8/2006 | Underwood |
| 7,103,068 B1 | 9/2006 | Gardner et al. |
| 7,107,285 B2 | 9/2006 | von Kaenel et al. |
| 7,113,779 B1 | 9/2006 | Fujisaki |
| 7,113,962 B1 | 9/2006 | Kee et al. |
| 7,114,180 B1 | 9/2006 | DeCaprio |
| 7,117,504 B2 | 10/2006 | Smith et al. |
| 7,117,530 B1 | 10/2006 | Lin |
| 7,120,596 B2 | 10/2006 | Hoffman et al. |
| 7,120,666 B2 | 10/2006 | McCanne et al. |
| 7,120,690 B1 | 10/2006 | Krishnan et al. |
| 7,120,852 B2 | 10/2006 | Terry et al. |
| 7,124,101 B1 | 10/2006 | Mikurak |
| 7,124,442 B2 | 10/2006 | Nash-Putnam |
| 7,126,955 B2 | 10/2006 | Nabhan et al. |
| 7,128,265 B2 | 10/2006 | Silverbrook et al. |
| 7,128,270 B2 | 10/2006 | Silverbrook et al. |
| 7,130,792 B2 | 10/2006 | Tokieda et al. |
| 7,130,807 B1 | 10/2006 | Mikurak |
| 7,131,596 B2 | 11/2006 | Lapstun et al. |
| 7,134,131 B1 | 11/2006 | Hendricks et al. |
| 7,135,991 B2 | 11/2006 | Slemmer et al. |
| 7,136,645 B2 | 11/2006 | Hanson et al. |
| 7,137,566 B2 | 11/2006 | Silverbrook et al. |
| 7,139,999 B2 | 11/2006 | Bowman-Amuah |
| 7,140,044 B2 | 11/2006 | Redlich et al. |
| 7,143,153 B1 | 11/2006 | Black et al. |
| 7,144,095 B2 | 12/2006 | Silverbrook |
| 7,146,384 B2 | 12/2006 | Sawafta |
| 7,146,644 B2 | 12/2006 | Redlich et al. |
| 7,149,698 B2 | 12/2006 | Guheen et al. |
| 7,149,897 B2 | 12/2006 | Chincheck et al. |
| 7,149,959 B1 | 12/2006 | Jones et al. |
| 7,150,398 B2 | 12/2006 | Silverbrook et al. |
| 7,152,047 B1 | 12/2006 | Nagel |
| 7,152,092 B2 | 12/2006 | Beams et al. |
| 7,152,207 B1 | 12/2006 | Underwood et al. |
| 7,155,518 B2 | 12/2006 | Forslow |
| 7,155,676 B2 | 12/2006 | Land et al. |
| 7,159,014 B2 | 1/2007 | Kausik et al. |
| 7,159,777 B2 | 1/2007 | Silverbrook et al. |
| 7,162,540 B2 | 1/2007 | Jasen et al. |
| 7,164,680 B2 | 1/2007 | Loguinov |
| 7,165,041 B1 | 1/2007 | Guheen et al. |
| 7,167,844 B1 | 1/2007 | Leong et al. |
| 7,171,379 B2 | 1/2007 | Menninger et al. |
| 7,175,089 B2 | 2/2007 | Silverbrook et al. |
| 7,178,106 B2 | 2/2007 | Lamkin et al. |
| 7,178,719 B2 | 2/2007 | Silverbrook et al. |
| 7,181,766 B2 | 2/2007 | Bendinelli et al. |
| 7,184,445 B2 | 2/2007 | Gupta et al. |
| 7,187,470 B2 | 3/2007 | Lapstun et al. |
| 7,188,273 B2 | 3/2007 | Allen et al. |
| 7,188,769 B2 | 3/2007 | Silverbrook et al. |
| 7,191,252 B2 | 3/2007 | Redlich et al. |
| 7,194,761 B1 | 3/2007 | Champagne |
| 7,197,374 B2 | 3/2007 | Silverbrook et al. |
| 7,197,502 B2 | 3/2007 | Feinsmith |
| 7,197,570 B2 | 3/2007 | Eylon et al. |
| 7,197,751 B2 | 3/2007 | Fedotov et al. |
| 7,199,885 B2 | 4/2007 | Dodge |
| 7,200,804 B1 | 4/2007 | Khavari et al. |
| 7,206,811 B2 | 4/2007 | Skurikhin et al. |
| 7,207,483 B2 | 4/2007 | Silverbrook et al. |
| 7,207,485 B2 | 4/2007 | Silverbrook et al. |
| 7,212,296 B2 | 5/2007 | Dodge et al. |
| 7,216,173 B2 | 5/2007 | Clayton et al. |
| 7,219,127 B2 | 5/2007 | Huck et al. |
| 7,221,660 B1 | 5/2007 | Simonson et al. |
| 7,222,152 B1 | 5/2007 | Thompson et al. |
| 7,222,305 B2 | 5/2007 | Teplov et al. |
| 7,225,040 B2 | 5/2007 | Eller et al. |
| 7,225,244 B2 | 5/2007 | Reynolds et al. |
| 7,225,382 B2 | 5/2007 | Ramech et al. |
| 7,228,459 B2 | 6/2007 | Jiang et al. |
| 7,246,233 B2 | 7/2007 | Brabson et al. |
| 7,249,351 B1 | 7/2007 | Songer et al. |
| 7,260,617 B2 | 8/2007 | Bazinet et al. |
| 7,260,840 B2 | 8/2007 | Swander et al. |
| 7,263,071 B2 | 8/2007 | Yim |
| 7,272,853 B2 | 9/2007 | Goodman et al. |
| 7,284,044 B2 | 10/2007 | Teraoaka et al. |
| 7,318,100 B2 | 1/2008 | Demmer et al. |
| 7,321,906 B2 | 1/2008 | Green |
| 7,328,267 B1 | 2/2008 | Bashyam et al. |
| 7,340,772 B2 | 3/2008 | Panasyuk et al. |
| 7,353,533 B2 | 4/2008 | Wright et al. |
| 7,363,347 B2 | 4/2008 | Thomas |
| 7,363,378 B2 | 4/2008 | Holmes et al. |
| 7,370,353 B2 | 5/2008 | Yang |
| 7,386,631 B1 | 6/2008 | Sibal et al. |
| 7,389,462 B1 | 6/2008 | Wang et al. |
| 7,392,348 B2 | 6/2008 | Dumont |
| 7,398,320 B1 | 7/2008 | Minakuchi et al. |
| 7,398,552 B2 | 7/2008 | Pardee et al. |
| 7,401,116 B1 | 7/2008 | Chalfin et al. |
| 7,404,003 B1 | 7/2008 | Noble |
| 7,406,533 B2 | 7/2008 | Li et al. |
| 7,409,708 B2 | 8/2008 | Goodman et al. |
| 7,415,723 B2 | 8/2008 | Pandya |
| 7,420,992 B1 | 9/2008 | Fang et al. |
| 7,433,314 B2 | 10/2008 | Sharma et al. |
| 7,441,119 B2 | 10/2008 | Brabson et al. |
| 7,458,095 B2 | 11/2008 | Forsberg |
| 7,464,264 B2 | 12/2008 | Goodman et al. |
| 7,480,312 B2 | 1/2009 | Ossman |
| 7,496,659 B1 | 2/2009 | Coverdill et al. |
| 7,505,455 B1 | 3/2009 | Goodwin et al. |
| 7,512,702 B1 | 3/2009 | Srivastava et al. |
| 7,522,581 B2 | 4/2009 | Acharya et al. |
| 7,533,409 B2 | 5/2009 | Keane et al. |
| 7,536,715 B2 | 5/2009 | Markham |
| 7,577,144 B2 | 8/2009 | Chang et al. |
| 7,606,902 B2 | 10/2009 | Rao et al. |
| 7,609,721 B2 | 10/2009 | Rao et al. |
| 7,644,188 B2 | 1/2010 | Vlodavsky et al. |
| 7,673,048 B1 | 3/2010 | O'Toole et al. |
| 7,757,074 B2 | 7/2010 | Sundarrajan et al. |
| 7,775,074 B1 | 8/2010 | Tobias et al. |

(56) References Cited

U.S. PATENT DOCUMENTS

| | | |
|---|---|---|
| 7,882,247 B2 | 2/2011 | Sturniolo et al. |
| 7,921,184 B2 | 4/2011 | Sundarrajan et al. |
| 7,945,678 B1 | 5/2011 | Skene |
| 7,979,528 B2 | 7/2011 | Eisenberg et al. |
| 7,979,694 B2 | 7/2011 | Touitou et al. |
| 8,005,981 B2 | 8/2011 | Tuck et al. |
| 8,205,000 B2 | 6/2012 | Chang et al. |
| 8,223,647 B2 | 7/2012 | Kakani et al. |
| 8,261,057 B2 | 9/2012 | Sundarrajan et al. |
| 8,351,327 B1 | 1/2013 | Binns |
| 2001/0030970 A1 | 10/2001 | Wiryaman et al. |
| 2001/0037387 A1 | 11/2001 | Gilde et al. |
| 2001/0043600 A1 | 11/2001 | Chatterjee et al. |
| 2001/0046212 A1 | 11/2001 | Nakajima |
| 2001/0047406 A1 | 11/2001 | Araujo et al. |
| 2001/0049717 A1 | 12/2001 | Freeman et al. |
| 2001/0049741 A1 | 12/2001 | Skene et al. |
| 2001/0052016 A1 | 12/2001 | Skene et al. |
| 2001/0052065 A1 | 12/2001 | Alexander, III et al. |
| 2002/0004834 A1 | 1/2002 | Guenther et al. |
| 2002/0004902 A1 | 1/2002 | Toh et al. |
| 2002/0007402 A1 | 1/2002 | Huston et al. |
| 2002/0007404 A1 | 1/2002 | Vange et al. |
| 2002/0016827 A1 | 2/2002 | McCabe et al. |
| 2002/0023210 A1 | 2/2002 | Tuomenoksa et al. |
| 2002/0026478 A1 | 2/2002 | Rodgers et al. |
| 2002/0026531 A1 | 2/2002 | Keane et al. |
| 2002/0029285 A1 | 3/2002 | Collins |
| 2002/0032725 A1 | 3/2002 | Araujo et al. |
| 2002/0032798 A1 | 3/2002 | Xu |
| 2002/0035451 A1 | 3/2002 | Rothermel |
| 2002/0035596 A1 | 3/2002 | Yang et al. |
| 2002/0037079 A1 | 3/2002 | Duval |
| 2002/0038339 A1 | 3/2002 | Xu |
| 2002/0042875 A1 | 4/2002 | Shukla |
| 2002/0049608 A1 | 4/2002 | Hartsell et al. |
| 2002/0049841 A1 | 4/2002 | Johnson et al. |
| 2002/0055966 A1 | 5/2002 | Border et al. |
| 2002/0057717 A1 | 5/2002 | Mallory |
| 2002/0059274 A1 | 5/2002 | Hartsell et al. |
| 2002/0059429 A1 | 5/2002 | Carpenter et al. |
| 2002/0059435 A1 | 5/2002 | Border et al. |
| 2002/0065864 A1 | 5/2002 | Hartsell et al. |
| 2002/0065919 A1 | 5/2002 | Taylor et al. |
| 2002/0069278 A1 | 6/2002 | Forslow |
| 2002/0071438 A1 | 6/2002 | Singh |
| 2002/0073061 A1 | 6/2002 | Collins |
| 2002/0073298 A1* | 6/2002 | Geiger et al. ................. 711/206 |
| 2002/0081971 A1 | 6/2002 | Travostino |
| 2002/0083175 A1 | 6/2002 | Afek et al. |
| 2002/0083183 A1 | 6/2002 | Pujare et al. |
| 2002/0087729 A1 | 7/2002 | Edgar |
| 2002/0091788 A1 | 7/2002 | Chlan et al. |
| 2002/0095400 A1 | 7/2002 | Johnson et al. |
| 2002/0095498 A1 | 7/2002 | Chanda et al. |
| 2002/0098840 A1 | 7/2002 | Hanson et al. |
| 2002/0099940 A1 | 7/2002 | Wang |
| 2002/0101848 A1 | 8/2002 | Lee et al. |
| 2002/0101860 A1 | 8/2002 | Thornton et al. |
| 2002/0105972 A1 | 8/2002 | Richter et al. |
| 2002/0107903 A1 | 8/2002 | Richter et al. |
| 2002/0107962 A1 | 8/2002 | Richter et al. |
| 2002/0107971 A1 | 8/2002 | Bailey et al. |
| 2002/0107989 A1 | 8/2002 | Johnson et al. |
| 2002/0107990 A1 | 8/2002 | Johnson et al. |
| 2002/0108059 A1 | 8/2002 | Canion et al. |
| 2002/0116452 A1 | 8/2002 | Johnson et al. |
| 2002/0116582 A1 | 8/2002 | Copeland et al. |
| 2002/0120710 A1 | 8/2002 | Chintalapati et al. |
| 2002/0120743 A1 | 8/2002 | Shabtay et al. |
| 2002/0126675 A1 | 9/2002 | Yoshimura et al. |
| 2002/0133593 A1 | 9/2002 | Johnson et al. |
| 2002/0138511 A1 | 9/2002 | Psounis et al. |
| 2002/0138572 A1 | 9/2002 | Delany et al. |
| 2002/0138618 A1 | 9/2002 | Szabo |
| 2002/0138640 A1 | 9/2002 | Raz et al. |
| 2002/0147795 A1 | 10/2002 | Cantwell |
| 2002/0147822 A1 | 10/2002 | Susai et al. |
| 2002/0150064 A1 | 10/2002 | Lucidarme |
| 2002/0152373 A1 | 10/2002 | Sun et al. |
| 2002/0152423 A1 | 10/2002 | McCabe |
| 2002/0156927 A1 | 10/2002 | Boucher et al. |
| 2002/0161908 A1 | 10/2002 | Benitez et al. |
| 2002/0163882 A1 | 11/2002 | Bornstein et al. |
| 2002/0174227 A1 | 11/2002 | Hartsell et al. |
| 2002/0174255 A1 | 11/2002 | Hayter et al. |
| 2002/0176532 A1 | 11/2002 | McClelland et al. |
| 2002/0184224 A1 | 12/2002 | Haff et al. |
| 2002/0194382 A1 | 12/2002 | Kausik et al. |
| 2002/0196279 A1 | 12/2002 | Bloomfield et al. |
| 2002/0199007 A1 | 12/2002 | Clayton et al. |
| 2003/0009538 A1 | 1/2003 | Shah et al. |
| 2003/0014623 A1 | 1/2003 | Freed et al. |
| 2003/0014624 A1 | 1/2003 | Maturana et al. |
| 2003/0014625 A1* | 1/2003 | Freed et al. ................. 713/153 |
| 2003/0014628 A1 | 1/2003 | Freed et al. |
| 2003/0014650 A1* | 1/2003 | Freed et al. ................. 713/189 |
| 2003/0018891 A1* | 1/2003 | Hall et al. ................. 713/160 |
| 2003/0023767 A1 | 1/2003 | Brabson et al. |
| 2003/0026241 A1 | 2/2003 | Ono et al. |
| 2003/0033520 A1* | 2/2003 | Peiffer et al. ................. 713/153 |
| 2003/0037108 A1 | 2/2003 | Peiffer et al. |
| 2003/0039354 A1 | 2/2003 | Kimble et al. |
| 2003/0046586 A1 | 3/2003 | Bheemarasetti et al. |
| 2003/0046587 A1 | 3/2003 | Bheemarasetti et al. |
| 2003/0051100 A1* | 3/2003 | Patel ................. 711/118 |
| 2003/0051102 A1 | 3/2003 | Jacobs et al. |
| 2003/0055883 A1 | 3/2003 | Wiles, Jr. |
| 2003/0055962 A1 | 3/2003 | Freund et al. |
| 2003/0061505 A1 | 3/2003 | Sperry et al. |
| 2003/0065763 A1 | 4/2003 | Swildens et al. |
| 2003/0067874 A1 | 4/2003 | See et al. |
| 2003/0069941 A1 | 4/2003 | Peiffer |
| 2003/0079031 A1 | 4/2003 | Nagano |
| 2003/0084162 A1 | 5/2003 | Johnson et al. |
| 2003/0084165 A1 | 5/2003 | Kjellberg et al. |
| 2003/0088698 A1 | 5/2003 | Singh et al. |
| 2003/0088788 A1 | 5/2003 | Yang |
| 2003/0093488 A1 | 5/2003 | Yoshida et al. |
| 2003/0093566 A1 | 5/2003 | Jardin |
| 2003/0105604 A1 | 6/2003 | Ash et al. |
| 2003/0105977 A1* | 6/2003 | Brabson et al. ................. 713/201 |
| 2003/0110296 A1 | 6/2003 | Kirsch et al. |
| 2003/0110379 A1 | 6/2003 | Ylonen et al. |
| 2003/0112809 A1 | 6/2003 | Bharali et al. |
| 2003/0112823 A1 | 6/2003 | Collins et al. |
| 2003/0115421 A1 | 6/2003 | McHenry et al. |
| 2003/0123394 A1 | 7/2003 | Neale et al. |
| 2003/0123481 A1 | 7/2003 | Neale et al. |
| 2003/0131079 A1 | 7/2003 | Neale et al. |
| 2003/0131263 A1 | 7/2003 | Keane et al. |
| 2003/0140121 A1 | 7/2003 | Adams |
| 2003/0149899 A1 | 8/2003 | Boden et al. |
| 2003/0152028 A1 | 8/2003 | Raisanen et al. |
| 2003/0154110 A1 | 8/2003 | Walter et al. |
| 2003/0154239 A1 | 8/2003 | Davis et al. |
| 2003/0165138 A1 | 9/2003 | Swonk et al. |
| 2003/0167403 A1 | 9/2003 | McCurley et al. |
| 2003/0174718 A1 | 9/2003 | Sampath et al. |
| 2003/0177389 A1 | 9/2003 | Albert et al. |
| 2003/0177395 A1 | 9/2003 | Pardee et al. |
| 2003/0182423 A1 | 9/2003 | Shafir et al. |
| 2003/0182431 A1 | 9/2003 | Sturniolo et al. |
| 2003/0182437 A1 | 9/2003 | Kobayashi et al. |
| 2003/0188001 A1 | 10/2003 | Eisenberg et al. |
| 2003/0191799 A1 | 10/2003 | Araujo et al. |
| 2003/0191812 A1 | 10/2003 | Agarwalla et al. |
| 2003/0198189 A1 | 10/2003 | Roberts et al. |
| 2003/0200295 A1 | 10/2003 | Roberts et al. |
| 2003/0200353 A1 | 10/2003 | Dogra et al. |
| 2003/0208602 A1 | 11/2003 | Bhalla et al. |
| 2003/0212760 A1 | 11/2003 | Chen et al. |
| 2003/0212776 A1 | 11/2003 | Roberts et al. |
| 2003/0217105 A1 | 11/2003 | Zircher et al. |

(56) References Cited

U.S. PATENT DOCUMENTS

| | | |
|---|---|---|
| 2003/0217126 A1 | 11/2003 | Polcha et al. |
| 2003/0217149 A1 | 11/2003 | Crichton et al. |
| 2003/0223361 A1 | 12/2003 | Hussain et al. |
| 2003/0223418 A1 | 12/2003 | Desai et al. |
| 2003/0223433 A1 | 12/2003 | Lee et al. |
| 2003/0226018 A1 | 12/2003 | Tardo et al. |
| 2003/0229718 A1 | 12/2003 | Tock et al. |
| 2003/0229761 A1* | 12/2003 | Basu et al. .................. 711/134 |
| 2003/0231659 A1 | 12/2003 | DiMambro et al. |
| 2003/0233423 A1 | 12/2003 | Dilley et al. |
| 2003/0236831 A1 | 12/2003 | Ortiz et al. |
| 2003/0236837 A1 | 12/2003 | Johnson et al. |
| 2003/0236861 A1 | 12/2003 | Johnson et al. |
| 2003/0236919 A1 | 12/2003 | Johnson et al. |
| 2004/0003101 A1 | 1/2004 | Roth et al. |
| 2004/0003137 A1 | 1/2004 | Callender et al. |
| 2004/0006708 A1 | 1/2004 | Mukherjee et al. |
| 2004/0008693 A1 | 1/2004 | Grove et al. |
| 2004/0010601 A1 | 1/2004 | Afergan et al. |
| 2004/0010604 A1 | 1/2004 | Tanaka et al. |
| 2004/0010621 A1 | 1/2004 | Afergan et al. |
| 2004/0031058 A1 | 2/2004 | Reisman |
| 2004/0034744 A1 | 2/2004 | Karlsson et al. |
| 2004/0034794 A1 | 2/2004 | Mayer et al. |
| 2004/0039827 A1 | 2/2004 | Thomas et al. |
| 2004/0042487 A1 | 3/2004 | Ossman |
| 2004/0044521 A1 | 3/2004 | Chen et al. |
| 2004/0044731 A1 | 3/2004 | Chen et al. |
| 2004/0049515 A1 | 3/2004 | Haff et al. |
| 2004/0073716 A1 | 4/2004 | Boom et al. |
| 2004/0078621 A1 | 4/2004 | Talaugon et al. |
| 2004/0078772 A1 | 4/2004 | Balay et al. |
| 2004/0087304 A1 | 5/2004 | Buddhikot et al. |
| 2004/0098486 A1* | 5/2004 | Gu et al. .................. 709/228 |
| 2004/0100976 A1 | 5/2004 | Chang et al. |
| 2004/0103150 A1 | 5/2004 | Ogdon et al. |
| 2004/0103225 A1 | 5/2004 | McAlpine et al. |
| 2004/0103438 A1 | 5/2004 | Yan et al. |
| 2004/0107360 A1 | 6/2004 | Herrmann et al. |
| 2004/0111519 A1 | 6/2004 | Fu et al. |
| 2004/0128252 A1 | 7/2004 | Shirai et al. |
| 2004/0128346 A1 | 7/2004 | Melamed et al. |
| 2004/0141525 A1 | 7/2004 | Bhushan et al. |
| 2004/0143655 A1 | 7/2004 | Narad et al. |
| 2004/0143734 A1 | 7/2004 | Buer et al. |
| 2004/0146053 A1 | 7/2004 | Nabhan et al. |
| 2004/0158705 A1 | 8/2004 | Burdett et al. |
| 2004/0162876 A1 | 8/2004 | Kohavi |
| 2004/0177158 A1 | 9/2004 | Bauch et al. |
| 2004/0177359 A1 | 9/2004 | Bauch et al. |
| 2004/0190092 A1 | 9/2004 | Silverbrook et al. |
| 2004/0202171 A1 | 10/2004 | Hama |
| 2004/0203296 A1 | 10/2004 | Moreton et al. |
| 2004/0205439 A1 | 10/2004 | Carmeli et al. |
| 2004/0210320 A1 | 10/2004 | Pandya |
| 2004/0213248 A1 | 10/2004 | Okuda et al. |
| 2004/0215665 A1 | 10/2004 | Edgar et al. |
| 2004/0215746 A1 | 10/2004 | McCanne et al. |
| 2004/0221031 A1 | 11/2004 | Desai |
| 2004/0225898 A1 | 11/2004 | Frost et al. |
| 2004/0225911 A1 | 11/2004 | Smith |
| 2004/0230840 A1 | 11/2004 | Radatti |
| 2004/0246971 A1 | 12/2004 | Banerjee et al. |
| 2004/0249975 A1 | 12/2004 | Tuck et al. |
| 2004/0258003 A1 | 12/2004 | Kokot et al. |
| 2004/0260922 A1 | 12/2004 | Goodman et al. |
| 2004/0268175 A1 | 12/2004 | Koch et al. |
| 2004/0268357 A1 | 12/2004 | Joy et al. |
| 2004/0268358 A1 | 12/2004 | Darling et al. |
| 2005/0005014 A1 | 1/2005 | Holmes et al. |
| 2005/0005107 A1* | 1/2005 | Touboul .................. 713/165 |
| 2005/0013280 A1 | 1/2005 | Buddhikot et al. |
| 2005/0021762 A1 | 1/2005 | Gbadegesin |
| 2005/0022011 A1 | 1/2005 | Swander et al. |
| 2005/0022012 A1 | 1/2005 | Bluestone et al. |
| 2005/0022031 A1 | 1/2005 | Goodman et al. |
| 2005/0025150 A1 | 2/2005 | Helmy et al. |
| 2005/0027788 A1 | 2/2005 | Koopmans et al. |
| 2005/0031058 A1 | 2/2005 | Soong et al. |
| 2005/0033858 A1 | 2/2005 | Swildens et al. |
| 2005/0033926 A1 | 2/2005 | Dumont |
| 2005/0044350 A1 | 2/2005 | White et al. |
| 2005/0050317 A1 | 3/2005 | Kramer et al. |
| 2005/0055690 A1 | 3/2005 | Cornillon et al. |
| 2005/0058112 A1 | 3/2005 | Lahey et al. |
| 2005/0080850 A1 | 4/2005 | Salesky et al. |
| 2005/0080907 A1 | 4/2005 | Panasyuk et al. |
| 2005/0086386 A1 | 4/2005 | Shen et al. |
| 2005/0102529 A1 | 5/2005 | Buddhikot et al. |
| 2005/0108412 A1 | 5/2005 | Sjollema et al. |
| 2005/0108517 A1* | 5/2005 | Dillon et al. .................. 713/150 |
| 2005/0122980 A1 | 6/2005 | Anand et al. |
| 2005/0125663 A1 | 6/2005 | Funk |
| 2005/0132030 A1 | 6/2005 | Hopen et al. |
| 2005/0132060 A1 | 6/2005 | Mo et al. |
| 2005/0135250 A1 | 6/2005 | Singh et al. |
| 2005/0144186 A1 | 6/2005 | Hesselink et al. |
| 2005/0144481 A1 | 6/2005 | Hopen et al. |
| 2005/0147126 A1 | 7/2005 | Qiu et al. |
| 2005/0149481 A1 | 7/2005 | Hesselink et al. |
| 2005/0149726 A1 | 7/2005 | Joshi et al. |
| 2005/0165928 A1 | 7/2005 | Shu et al. |
| 2005/0177866 A1 | 8/2005 | Kirsch |
| 2005/0185647 A1 | 8/2005 | Rao et al. |
| 2005/0193075 A1 | 9/2005 | Haff et al. |
| 2005/0195780 A1 | 9/2005 | Haverinen et al. |
| 2005/0198380 A1 | 9/2005 | Panasyuk et al. |
| 2005/0198532 A1 | 9/2005 | Comlekoglu et al. |
| 2005/0210150 A1 | 9/2005 | Bahl |
| 2005/0223412 A1 | 10/2005 | Nadalin et al. |
| 2005/0232161 A1 | 10/2005 | Maufer et al. |
| 2005/0232298 A1 | 10/2005 | Beverly et al. |
| 2005/0246346 A1 | 11/2005 | Gerdes et al. |
| 2005/0246445 A1 | 11/2005 | Panasyuk et al. |
| 2005/0256923 A1 | 11/2005 | Adachi |
| 2005/0259634 A1 | 11/2005 | Ross |
| 2005/0262357 A1 | 11/2005 | Araujo et al. |
| 2005/0265315 A1 | 12/2005 | Edgar |
| 2005/0265353 A1 | 12/2005 | Sengupta et al. |
| 2005/0267974 A1 | 12/2005 | Panasyuk et al. |
| 2005/0286466 A1 | 12/2005 | Tagg et al. |
| 2006/0005240 A1 | 1/2006 | Sundarrajan et al. |
| 2006/0015570 A1 | 1/2006 | Khemani et al. |
| 2006/0018332 A1 | 1/2006 | Kakani et al. |
| 2006/0031547 A1 | 2/2006 | Tsui et al. |
| 2006/0034283 A1 | 2/2006 | Ko et al. |
| 2006/0041635 A1 | 2/2006 | Alexander et al. |
| 2006/0053164 A1 | 3/2006 | Ewing et al. |
| 2006/0053253 A1 | 3/2006 | Roth et al. |
| 2006/0059370 A1* | 3/2006 | Asnis et al. .................. 713/189 |
| 2006/0064500 A1 | 3/2006 | Roth et al. |
| 2006/0069719 A1 | 3/2006 | McCanne et al. |
| 2006/0080441 A1 | 4/2006 | Chen et al. |
| 2006/0089996 A1 | 4/2006 | Peiffer |
| 2006/0095758 A1 | 5/2006 | Kim et al. |
| 2006/0112185 A1 | 5/2006 | van Bemmel |
| 2006/0123477 A1 | 6/2006 | Raghavan et al. |
| 2006/0129689 A1 | 6/2006 | Ho et al. |
| 2006/0133405 A1 | 6/2006 | Fee |
| 2006/0142878 A1 | 6/2006 | Banik et al. |
| 2006/0167975 A1 | 7/2006 | Chan et al. |
| 2006/0185010 A1 | 8/2006 | Sultan |
| 2006/0195840 A1 | 8/2006 | Sundarrajan et al. |
| 2006/0225130 A1 | 10/2006 | Chen et al. |
| 2006/0245414 A1 | 11/2006 | Susai et al. |
| 2006/0271652 A1 | 11/2006 | Stavrakos et al. |
| 2006/0274828 A1 | 12/2006 | Siemens et al. |
| 2007/0008883 A1 | 1/2007 | Kobayashi |
| 2007/0061067 A1 | 3/2007 | Zeinstra et al. |
| 2007/0067366 A1 | 3/2007 | Landis |
| 2007/0110046 A1 | 5/2007 | Farrell et al. |
| 2007/0130324 A1 | 6/2007 | Wang |
| 2007/0130334 A1 | 6/2007 | Carley |
| 2007/0156852 A1 | 7/2007 | Sundarrajan et al. |

(56) References Cited

U.S. PATENT DOCUMENTS

| | | |
|---|---|---|
| 2007/0156876 A1 | 7/2007 | Sundarrajan et al. |
| 2007/0169179 A1 | 7/2007 | Narad |
| 2007/0179955 A1 | 8/2007 | Croft et al. |
| 2007/0192827 A1 | 8/2007 | Maxted et al. |
| 2007/0206621 A1 | 9/2007 | Plamondon et al. |
| 2007/0233910 A1 | 10/2007 | Paley et al. |
| 2007/0245409 A1 | 10/2007 | Harris et al. |
| 2008/0034416 A1 | 2/2008 | Kumar et al. |
| 2008/0046616 A1 | 2/2008 | Verzunov et al. |
| 2008/0049786 A1 | 2/2008 | Ram et al. |
| 2008/0071915 A1 | 3/2008 | Gbadegesin |
| 2008/0225720 A1 | 9/2008 | Khemani et al. |
| 2008/0225748 A1 | 9/2008 | Khemani et al. |
| 2008/0225753 A1 | 9/2008 | Khemani et al. |
| 2008/0229381 A1 | 9/2008 | Sikka et al. |
| 2008/0320151 A1 | 12/2008 | McCanne et al. |
| 2009/0133015 A1 | 5/2009 | Nagashima |
| 2010/0241846 A1 | 9/2010 | Sundarrajan et al. |

FOREIGN PATENT DOCUMENTS

| | | |
|---|---|---|
| EP | 0 436 365 | 7/1991 |
| EP | 0618708 | 10/1994 |
| EP | 0 838 930 A2 | 4/1998 |
| EP | 1 045 553 | 10/2000 |
| EP | 1 134 942 | 9/2001 |
| EP | 1 427 133 | 6/2004 |
| EP | 1 432 209 | 6/2004 |
| JP | 07-302237 A | 11/1995 |
| JP | 08-006910 A | 1/1996 |
| JP | 10-178450 | 6/1998 |
| JP | 2002-532784 | 2/2002 |
| JP | 2002-084289 | 3/2002 |
| JP | 2004078783 | 3/2004 |
| WO | WO-99/04343 | 1/1999 |
| WO | WO-00/34885 | 6/2000 |
| WO | WO-01/47185 A2 | 6/2001 |
| WO | WO-02/13037 | 2/2002 |
| WO | WO-02/23362 A1 | 3/2002 |
| WO | WO-02/39301 A2 | 5/2002 |
| WO | WO-02/069604 A2 | 9/2002 |
| WO | WO-03/019876 | 3/2003 |
| WO | WO-03/026244 | 3/2003 |
| WO | WO-03/048936 A1 | 6/2003 |
| WO | WO-03/083692 | 10/2003 |
| WO | WO-2004/088933 | 10/2004 |
| WO | WO-2004/114529 A2 | 12/2004 |
| WO | WO-2005/013534 | 2/2005 |
| WO | WO-2005/024567 A2 | 3/2005 |
| WO | WO-2005/048106 | 5/2005 |
| WO | WO-2005/088476 | 9/2005 |
| WO | WO-2006005078 | 1/2006 |
| WO | WO-2006/012612 | 2/2006 |
| WO | WO-2006/020823 | 2/2006 |
| WO | WO-2006/074072 A3 | 7/2006 |
| WO | WO-2006/075219 A2 | 7/2006 |
| WO | WO-2008/112691 A2 | 9/2008 |
| WO | WO-2008/112698 A2 | 9/2008 |

OTHER PUBLICATIONS

International Search Report for PCT/US2005/047435. mailing date Sep. 8, 2006. 5 pages.
International Search Report, PCT/US05/23914, mailed on May 7, 2007. 3 pages.
Non Final Office Action dated Nov. 21, 2007 for U.S. Appl. No. 11/323,196. 14 pages.
Non Final Office Action dated Jan. 8, 2008 for U.S. Appl. No. 11/324,146. 12 pages.
Non Final Office Action, U.S. Appl. No. 11/323,196. dated May 14, 2008.
Office Action from Sep. 25, 2008 for U.S. Appl. No. 11/323,196, 19 pages.
Office Action from Oct. 3, 2008 for U.S. Appl. No. 11/324,131, pp. 22.
Office Action from Nov. 12, 2008 for U.S. Appl. No. 11/324,146, pp. 17.
Office Action from Dec. 30, 2008 for U.S. Appl. No. 11/323,353, pp. 22.
Office Action from Feb. 13, 2009 for U.S. Appl. No. 11/323,196, pp. 13.
Office Action from Feb. 27, 2009 for U.S. Appl. No. 11/324,141, pp. 10.
Doug Allen, Layer-7 Load Balancers Pack New Punch, CMP Media LLC Network Magazine, Sep. 2003.
Office Action U.S. Appl. No. 11/324,146, filed Nov. 13, 2009.
Decision on Rejection issued Jun. 3, 2013 in Chinese Patent Application No. 201110075213.7.
European Examination Report ob 05768770.9 dated Jun. 13, 2012.
Examination Report on 3925/KOLNP/2006 dated Nov. 23, 2012.
Notice of Allowance on U.S. Appl. No. 11/324,131 dated Sep. 26, 2012.
Notice of Allowance on U.S. Appl. No. 11/324,146 dated Jun. 26, 2012.
Notice of Allowance on U.S. Appl. No. 11/324,146 dated Jul. 6, 2012.
Office Action for U.S. Appl. No. 11/324,141 dated Apr. 26, 2011.
Office Action for U.S. Appl. No. 11/324,141 dated Aug. 21, 2009.
Office Action on U.S. Appl. No. 13/031,919 dated Jun. 6, 2012.
Office Action on U.S. Appl. No. 13/031,919 dated Sep. 26, 2012.
Reynolds et al., "Aloe vera leaf gel: a review update", Journal of Ethnopharmacology, vol. 68, pp. 3-37, 1999.
Second Chinese Office Action on 201110075213.7 dated Nov. 1, 2012.
Third Office Action issued in Chinese Application No. 200580028489.2 on Feb. 1, 2013.
US Notice of Allowance on 099011-0158 DTD Mar. 29, 2013.
US Office Action on 099011-2006579-0457-0532-US DTD Jul. 28, 2010.
US Office Action on 099011-3180 DTD May 17, 2013.
Written Opinion for PCT/US2005/047435 dated Aug. 8, 2006.
US69/34288-B2, Mar. 13, 2003, Jacobs et al.
U.S. Appl. No. 11/323,196 US Office Action Aug. 3, 2009.
U.S. Appl. No. 11/324,141 US Office Action Mar. 3, 2010.
Biagioni et al., Signature for a network Protocol Stack: A System Application of Standard ML, Jul. 1994.
Chinese Office Action on 200580028489.2 dated Mar. 5, 2012.
Chinese Office Action on 201110075213.7 dated Jan. 30, 2012.
Chinese Office Action on 201110076025.6 dated Oct. 26, 2011.
Dictionary service [online], [retrieved on Jul. 23, 2009]. Retrieved from the Internet &It;URL: http://dictionary.reference.com/browse/discard>.
Doug Allen, Layer-7 Load Balancers Pack New Punch, CMP Media LLC Network Magazine, Sep. 2003 [cited by examiner].
E.C. Hu et al."Adaptive Fast Path Architecture", IBM J. Res &Dev, vol. 45 Mar. 1, 2001, pp. 191-206, XP002663647, Retrieved from the Internet: URL:http://gec.di.uminho.pt/discip/minf/ac0203/ICCA03/IBM WebCachArch.pdf.
Chinese Office Action on 200580028489.2 dated Nov. 3, 2011.
European Examination Report on 05855924.6 dated Nov. 24, 2011.
European Supplementary Search Report on 05768770.9 dated Nov. 29, 2011.
Hasegawa et al., "A Mechanism for TCP Performance Enhancement over Assymetrical Environment," Proceedings 8th IEEE ISCC'03, 1530-1346/03, 2003.
Ipswitch Inc., WSFTP User's Guide, Chapter 8: Security, Jun. 25, 2003, 8 pages.
J. C. Mogul, "The Case for Persistent-Connection HTTP," 8282 Computer Communication Review 25, Oct. 1995.
Japanese Office Action on 2007-552147 dated Apr. 16, 2012.
Japanese Office Action on 2007-552147 dated Jun. 30, 2011.
Kong, et al; "Pseudo-serving: a user-responsible paradigm for internet access"; Apr. 7-11, 1997; SO Computer Networks and ISDN Systems; vol. 29; pp. 1053-1064.
Lazenka, M. "The Evolution of Software Distribution: Where Did We Come From and Where Are We Heading?", Nov. 6-9, 2005, ACM, p. 179-183.

(56) References Cited

OTHER PUBLICATIONS

Noriaki Kobayashi, "Internet VPN", N+1 Network Guide, vol. 3, No. 9, Oct. 1, 2003, pp. 44-49. (9 pages) (English Abstract).
Notice of Allowance for U.S. Appl. No. 11/323,353 dated Nov. 15, 2010.
Notice of Allowance on U.S. Appl. No. 11/324,141 dated Apr. 25, 2012.
Notice of Allowance on U.S. Appl. No. 12/020,649 dated Oct. 4, 2011.
Notice of Allowance on U.S. Appl. No. 12/020,963 dated Apr. 3, 2012.
Office Action for U.S. Appl. No. 11/324,131 dated Oct. 3, 2008.
Office Action for U.S. Appl. No. 11/324,131 dated Oct. 6, 2009.
Office Action for U.S. Appl. No. 11/324,131 dated Mar. 7, 2011.
Office Action for U.S. Appl. No. 11/324,131 dated Apr. 2, 2009.
Office Action for U.S. Appl. No. 11/324,131 dated May 27, 2010.
Office Action for U.S. Appl. No. 11/323,353 dated Jun. 3, 2009.
Office Action on U.S. Appl. No. 11/323,196 dated Nov. 19, 2009.
Office Action on U.S. Appl. No. 11/324,131 dated Jan. 4, 2012.
Office Action on U.S. Appl. No. 11/324,131 dated Aug. 11, 2011.
Office Action on U.S. Appl. No. 11/324,141 dated Nov. 10, 2010.
Office Action on U.S. Appl. No. 11/324,141 dated Dec. 15, 2011.
Office Action on U.S. Appl. No. 11/324,146 dated Jan. 24, 2012.
Office Action on U.S. Appl. No. 11/324,146 dated Feb. 15, 2011.
Office Action on U.S. Appl. No. 11/324,146 dated Jun. 22, 2011.
Office Action on U.S. Appl. No. 12/020,649 dated Mar. 28, 2011.
Office Action on U.S. Appl. No. 12/020,963 dated Jun. 10, 2011.
Office Action on U.S. Appl. No. 11/323,353 mailed on Dec. 10, 2009.
Office Action U.S. Appl. No. 11/324,146 Nov. 13, 2009.
Official Notification from Israeli Patent Office, for Appl No. 184750 mailed Apr. 7, 2011.
Pedro Hernandez, "Tacit Adds to Softricity's Spark", Nov. 18, 2005. Available online at: www.enterpriseitplant.com/networking/news/article.php/3565401.
R. Briscoe, "The Implications of Pervasive Computing on Network Design," BT Technology Journal, pp. 170-190, Jul. 2004.
Ranzau et al., "Softricity/Tacit, An Innovative Approach to Virtual Computing," http://www.daboc.com/downloadnow.aspx?file=211&is=617, Oct. 20, 2005.
Teruhara Serada, "SSL VPN", N+1 Network LAN, vol. 21, No. 3, Mar. 1, 2003, pp. 25-40. (19 pages) (English Abstract).
U.S. Appl. No. 11/323,196 Notice of Allowance Apr. 19, 2010.
U.S. Appl. No. 11/323,353 US Office Action Jun. 25, 2010.
U.S. Appl. No. 11/324,146 US Office Action Mar. 25, 2009.
Wang et al., Shield: Vulnerability-Driven Network Filters for Preventing Known Vulnerability Exploits, Feb. 2004, Microsoft Research, MSR-TR-2003-81.
Yoshikazu Kobayashi, VPN service introduction, Computer & Network LAN, vol. 21, No. 3, Mar. 1, 2003, pp. 25-40. (19 pages) (English Abstract).

\* cited by examiner

METHOD AND DEVICE FOR PERFORMING INTEGRATED CACHING IN A DATA COMMUNICATION NETWORK

CROSS-REFERENCE TO RELATED APPLICATIONS

This application is a non-provisional of and claims priority to provisional U.S. patent application No. 60/583,784, filed Jun. 30, 2004 and entitled "Method and Device for Performing Integrated Caching in a Data Communication Network", the entirety of which is incorporated by reference herein.

BACKGROUND OF THE INVENTION

1. Field of the Invention

The present invention relates generally to data communication networks. In particular, the present invention relates to a method and device for performing caching of data in a data communication network.

2. Background

The growth rate of network traffic continues to accelerate, albeit not quite at the exponential rates of the late 1990's. This expanding pace puts strains on the infrastructure that carries that traffic. Various solutions have arisen to permit network operators to handle this increasing problem, including the development of caching technology. With caching, content may be reused and served to clients without burdening server infrastructure. Additionally, caches can permit content to be placed closer to the end user thereby improving response time while also reducing server infrastructure burden.

Caching works by monitoring object requests made by one or more clients to a server on a network and saving the result of such request or requests in the storage of an appliance on the network. Subsequent requests for that same object are intercepted by the cache which delivers the object from its storage rather than passing the request on to the origin server. In this manner, caching provides the dual benefit of lowering response times and lowering the load on the server infrastructure.

However, as the Internet has expanded, multiple modes of processing data have developed to provide various performance, security and other benefits to network traffic. These modes of processing, however, have limited the effectiveness and performance capabilities of caches. Caches traditionally are not able to handle or process the variety of forms that data can take in the ever more complex and processed network environments and therefore the function and usefulness of such caches are commensurately limited.

Traditionally, caches have also been limited by virtue of being unable to serve to users that must be authenticated and/or authorized by the network prior to the delivery of content to such user. Authentication and authorization features have not been part of cache functionality.

Additional limitations of caches have included the inability to process and cache Hypertext Transfer Protocol over Secure Sockets Layer (HTTPS) traffic. Traditional caches have no way of decrypting, comprehending or processing encrypted traffic and therefore are unable to cache any HTTPS object or to provide end-to-end encryption for cached objects.

Furthermore, the ability of the cache to work with other network services and technologies including load balancing technology and other types of acceleration and packet processing has been less then optimal. The problem arises because of processing duplications and other inefficiencies introduced by traditional modes of integration that typically require multiple memory copies and frequent context switching to effect the integration.

The traditional approach to integrating a cache with other types of network processing usually involve placing multiple products in a line so that each function is carried out at a separate and independent node. This approach introduces considerable additional processing and a number of other inefficiencies as described below. Even if the technologies are combined within the same product, the combination is usually implemented in such a way that the benefits of caching when integrated with any other processing are diminished in the process of integration. The limitation of such integration arises as a result of the excess processing, copying and context switching involved in making these technologies work together.

The excess copying and switching results from the fact that each request or object must first be copied into a new form in the processor memory space by the application. The copying into memory space is performed in order to enable the additional processing (such as encryption/decryption, compression, connection offload or any other type of processing) to be carried out. The request or object must then be copied back to the packet level prior to being processed by the cache itself. Each additional type of processing generally requires packet copying to processor buffers, processing by the application and then copying back out for service by the cache. This approach to process integration therefore introduces multiple additional memory copies putting additional and unnecessary burdens upon the network infrastructure. An embodiment of the present invention minimizes this switching of contexts and duplicative processing as will be described below.

SUMMARY OF THE INVENTION

In order to achieve maximum performance, a device in accordance with an embodiment of the present invention efficiently integrates caching with the processing of one or more of (1) Secure Sockets Layer (SSL) encryption/decryption; (2) compression; (3) packet processing; (4) load balancing; (5) Transmission Control Protocol (TCP) buffering; (6) Authentication, Authorization and Auditing (AAA), (7) defense against distributed denial of service attacks (8), defense against HTTP/S based attacks such as Nimda, Code-Red, MyDoom etc., (9) offload of network processing, and (10) other processing, such as techniques to protect networks from network based viruses or attacks.

In particular, a device in accordance with an embodiment of the present invention integrates the foregoing technologies at the operating system (OS) or kernel level of the device rather than in the user/application level as a process or module. By integrating the cache features at this level of the computational structure and hierarchy, an embodiment of the present invention can much more efficiently synchronize caching processes with other processing of the connections to be carried out by or at the appliance including SSL decryption and end point processing, as well as the various others mentioned herein or otherwise carried out at the appliance. Such other processes can also include, in addition to each of the processes described above, connection processing, global server load balancing (GSLB), Hypertext Transfer Protocol (HTTP) compression, TCP compression, defenses against TCP and HTTP distributed denial of service attacks, HTTP virus defense scanning, and the like.

By integrating the variety of network processing and the caching at the OS or kernel level, an embodiment of the invention greatly increases the efficiency of such integration.

Working in the kernel space, an embodiment of the invention enables the cache to relate to a relevant object or request as a data structure where the cache maintains equal status to such data structure as each of the other applications. By carrying out tight integration in the kernel/OS space, the cache is also able to see the semantics/data structure of an HTTP or HTTPS request and to make more efficient caching decisions as a result of having access to such data structures. An embodiment of the present invention thereby avoids the problems of context switching and duplication associated with integrating in the more obvious, traditional approach of running a process in the user space.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
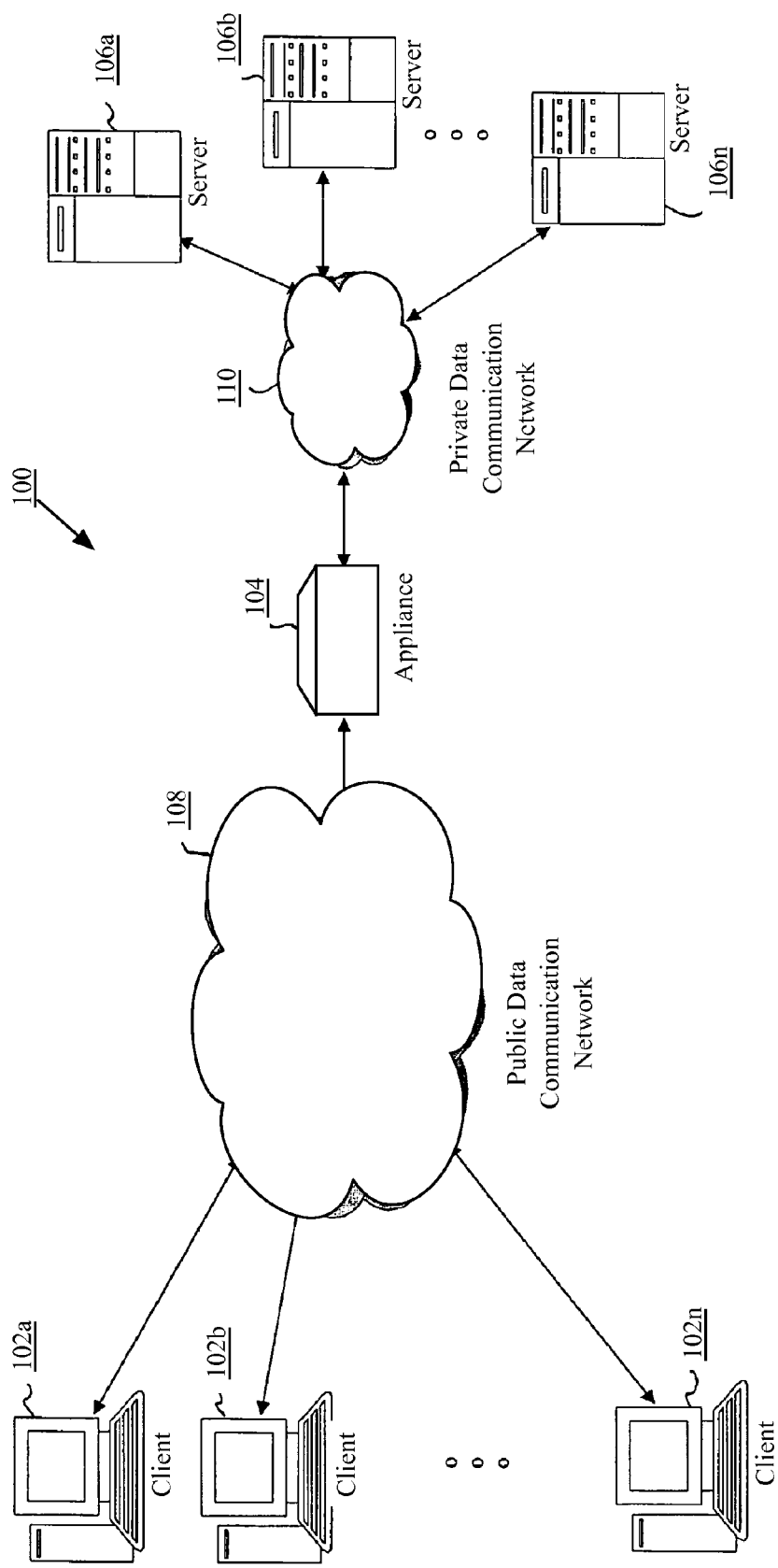
FIG. 1 illustrates an example data communication network environment in which an embodiment of the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Example Data Communication Network Environment

FIG. 1 illustrates an example data communication network environment 100 in which an embodiment of the present invention may be implemented. As shown in FIG. 1, example data communication network environment 100 includes a plurality of clients 102a-102n, an appliance 104, and a plurality of servers 106a-106n. Each of clients 102a-102n are communicatively coupled to appliance 104 via a public data communication network 108, while appliance 104 is communicatively coupled to servers 106a-106n via a private data communication network 110. In an embodiment, public data communication network 108 comprises the Internet and private data communication network 110 comprises an enterprise network, although the invention is not so limited.

In accordance with an embodiment of the present invention, appliance 104 includes a cache management logic and also includes or has access to a storage medium which it utilizes to implement a cache. Using these features, appliance 104 monitors object requests made by clients 102a-102n to any of servers 106a-106n. Objects returned from servers 106a-106n in response to these object requests are stored in the cache by appliance 104. Subsequent requests for the same object from any of clients 102a-102n are intercepted by appliance 104, which attempts to deliver the object from the cache rather than passing the request on to servers 106a-106n. This provides the dual benefit of reducing both the time required respond to requests from clients 102a-102n and the load on the infrastructure supporting servers 106a-106n.

As will be described in more detail herein, in an embodiment of the present invention, appliance 104 integrates this caching functionality at the operating system (OS)/kernel level of its software architecture with one or more other processing tasks, including but not limited to decryption, decompression, or authentication and/or authorization.

Example network environment 100 is presented by way of example only and is not intended to be limiting. Based on the teachings provided herein, persons skilled in the relevant art(s) will readily appreciate that the present invention may be implemented in any network environment in which object requests and responses are transferred between network nodes.

Figure 2:
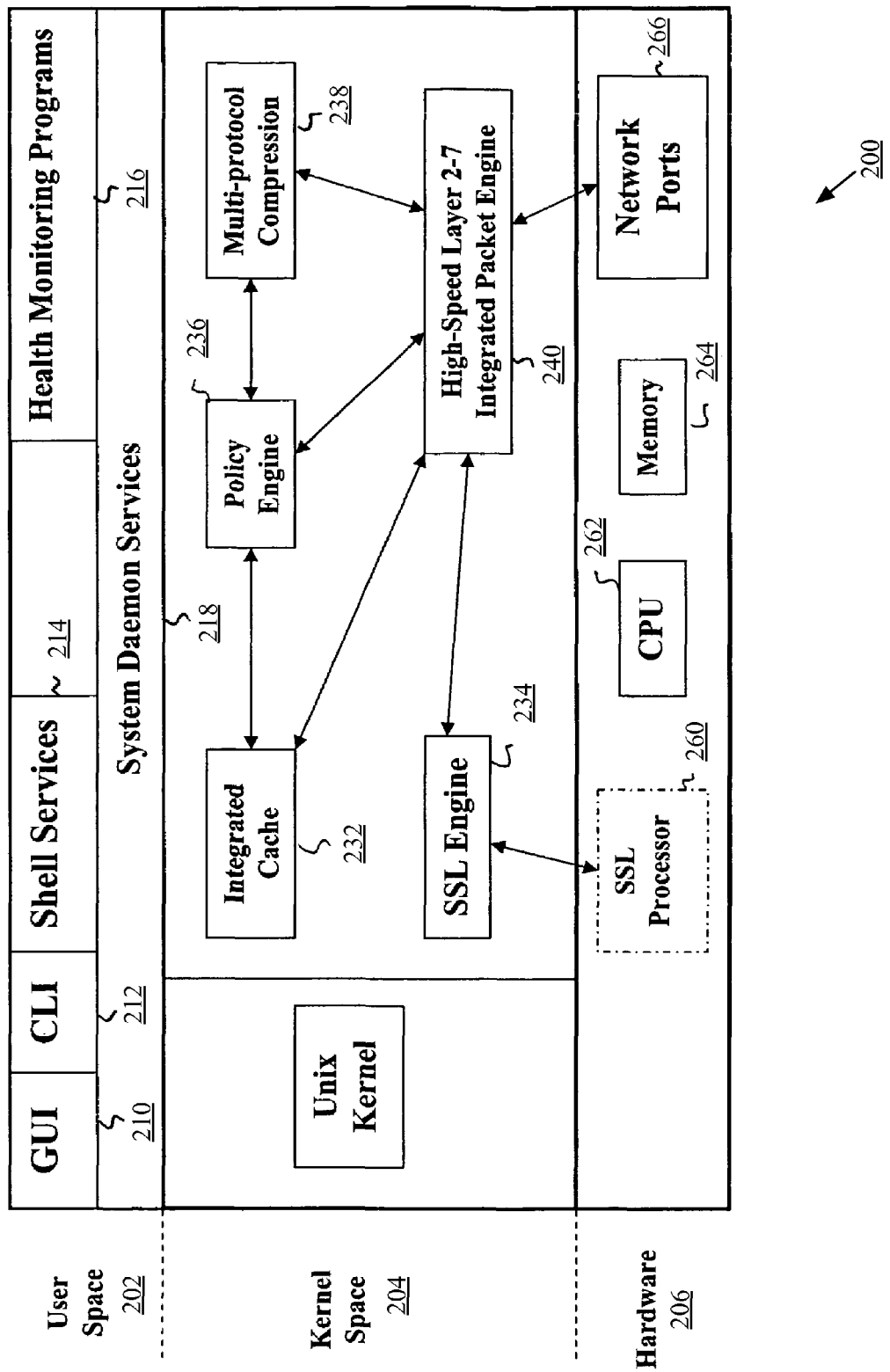
FIG. 2 illustrates an example software architecture of an appliance that performs integrated caching in accordance with an embodiment of the present invention.

B. Integrated Caching in a Data Communication Network in Accordance with an Embodiment of the Present Invention FIG. 2 illustrates an example software architecture 200 of appliance 104. Software architecture 200 is provided by way of illustration only and is not intended to be limiting. As shown in FIG. 2, example software architecture 200 consists of a hardware layer 206 and a software layer divided into a user space 202 and a kernel space 204.

Hardware layer 206 provides the structures upon which programs and services within kernel space 204 and user space 202 are executed. Hardware layer 206 also provides the structures which allow programs and services within kernel space 204 and user space 202 to communicate data both internally and externally with respect to appliance 104. As shown in FIG. 2, hardware layer 206 includes at least a central processing unit (CPU) 262 for executing software programs and services, a memory 264 for storing software and data, network ports 265 for transmitting and receiving data over a network, and an SSL processor 260 for performing functions related to Secure Sockets Layer processing of data transmitted and received over the network.

The operating system of appliance 104 segregates the available system memory into kernel space 204 and user space 204. In example software architecture 200, the operating system is depicted as a Unix operating system although the invention is not so limited. Kernel space 204 is strictly reserved for running Unix kernel 230, device drivers and any kernel extensions. In accordance with an embodiment of the present invention, kernel space 204 also includes a number of network services or processes working in conjunction with an integrated cache 232, the benefits of which are described in detail elsewhere herein.

As shown in FIG. 2, kernel space 204 includes at least a high-speed layer 2-7 integrated packet engine 240, an SSL engine 234, a policy engine 236 and multi-protocol compression logic 238. High speed layer 2-7 integrated packet engine 266 is responsible for managing the kernel-level processing of packets received and transmitted by appliance 104 via network ports 266. To this end, high speed layer 2-7 integrated packet engine 266 works in conjunction with SSL engine 234, integrated cache 232, policy engine 236 and multi-protocol compression logic 238. In particular, SSL engine is configured to perform SSL processing of packets, policy engine 236 is configured to perform functions related to traffic management such as request-level content switching and request-level cache redirection, and multi-protocol compression logic 238 is configured to perform functions related to compression and decompression of data. Integrated cache 232 is configured to perform an integrated caching function as described elsewhere herein.

In contrast to kernel space 204, user space 202 is the memory area used by all user mode applications. A user mode application cannot access kernel space 204 directly and must use service calls in order to access kernel services. As shown in FIG. 2, user space 202 of appliance 104 includes at least a graphical user interface (GUI) 210, a command line interface (CLI) 212, shell services 214, health monitoring programs 216, and daemon services 218. GUI 210 and CLI 212 provide a means by which a system administrator can interact with and control the operation of appliance 104. Health monitoring programs 216 are used to ensure that network systems are functioning properly and that users are receiving requested content over a network. Daemon services 218 are programs that run continuously and handle periodic service requests received by appliance 104. Each daemon program forwards the requests to other programs (or processes) as appropriate.

Figure 3:
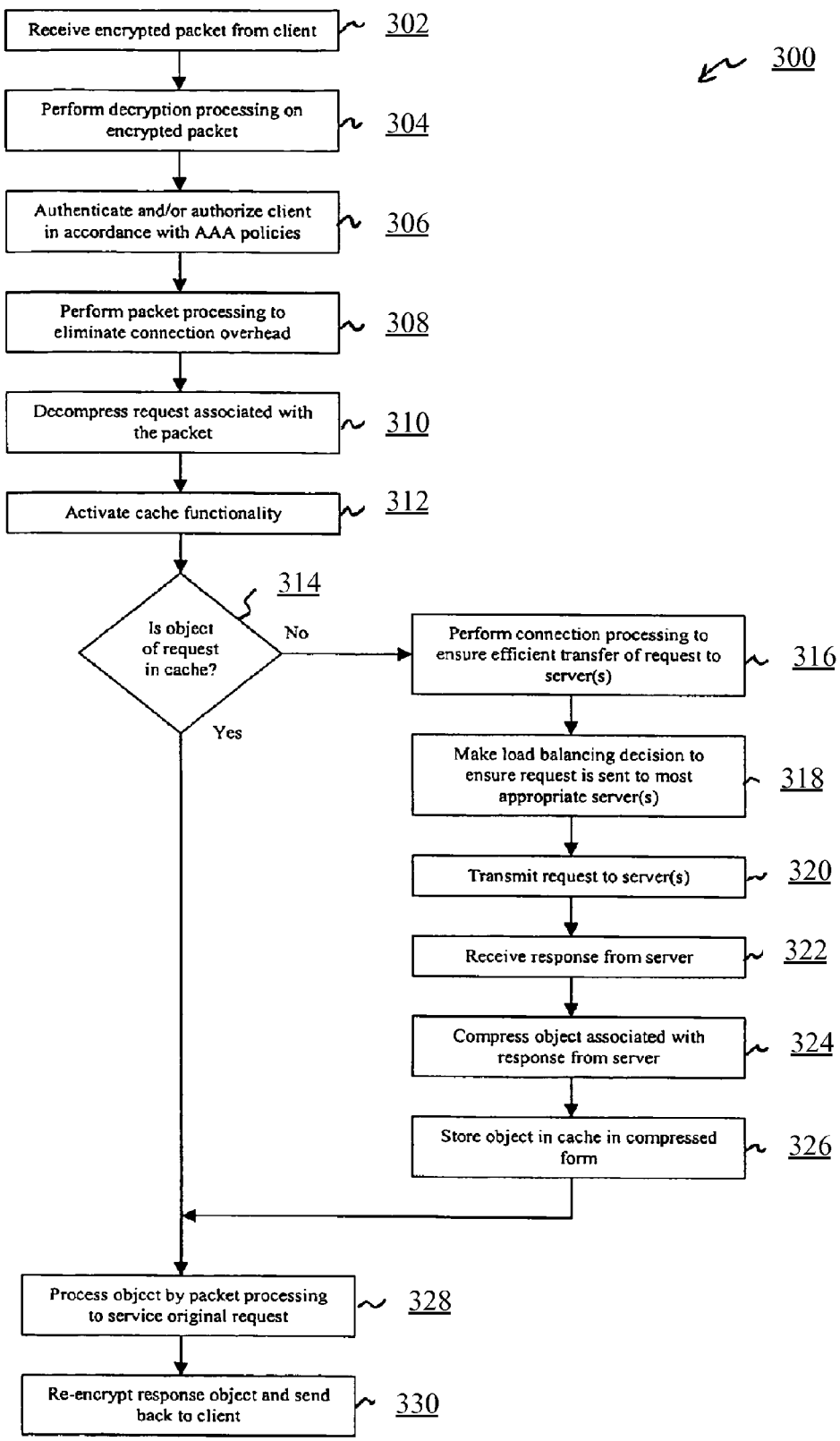
FIG. 3 illustrates a flowchart of a method for performing integrated caching in a device in accordance with an embodiment of the present invention.

FIG. 3 illustrates a flowchart 300 of a sequence of events that may occur in an appliance that provides integrated caching functionality in accordance with an embodiment of the present invention. However, the invention is not limited to the description provided by the flowchart 300. Rather, it will be apparent to persons skilled in the relevant art(s) from the teachings provided herein that other functional flows are within the scope and spirit of the present invention. These other functional flows could involve different processing, different sequencing and other variations on the integration of caching that is the subject of the present invention.

The method of flowchart 300 can be implemented in one or more device(s) that are communicatively coupled to a data communication network. For example, the method of flowchart 300 can be implemented in an appliance such as appliance 104 described above in reference to FIG. 1, having a software architecture 200 as described above in reference to FIG. 2. The method of flowchart 300 will be described with continued reference to this exemplary embodiment, although the invention is not so limited.

As shown in FIG. 3, the method of flowchart 300 begins at step 302, in which appliance 104 receives an encrypted packet from one of clients 102*a*-102*n*. In an embodiment, appliance 104 is configured to act as a proxy SSL endpoint for servers 106*a*-106*n*, decrypting encrypted packets received from clients 102*a*-102*n*, and then sending them on for further processing as necessary and ultimately on to an appropriate resource based on address information within the encrypted packets. The appropriate resource may be, for example, any of servers 106*a*-106*n* or the cache managed by appliance 104. At step 304, appliance 104 performs decryption processing on the packet.

At step 306, appliance 104, which is configured in accordance with an embodiment of the present invention to carry out AAA policies for access control, authenticates and/or authorizes the client from which the encrypted packet was received.

At step 308, appliance 104, which is configured in accordance with an embodiment of the present invention to perform certain types of packet processing, carries out packet processing on the decrypted packets to reduce the connection overhead processing requirements generated by the applicable network protocols.

At step 310, appliance 104, which is configured in accordance with an embodiment of the present invention to compress and decompress content, decompresses a request associated with the packet. In an embodiment, the request comprises a web object request, although the invention is not so limited.

At step 312, appliance 104 is then able to activate the cache functionality, which receives a clear and/or authorized and/or decompressed and/or packet-processed request for an object. Because of the prior processing described in reference to steps 302, 304, 306, 308 and 310, the cache management logic can make a decision as to whether the object has been cached or is cacheable based on a clear/authorized/decompressed/packet processed request and is therefore able to process a much wider array of requests then traditional caches and to carry out the caching more efficiently than under traditional approaches. Furthermore, because the cache management logic is working in the kernel space along with the other processes, it relates to the relevant object as a data structure with equal status in relation to such data structure as each of the other applications and therefore the integration is carried out in an extremely efficient manner.

As shown at step 314, if the object is not already in the cache memory, appliance 104 sends a request on to one or more of servers 106*a*-106*n*. Before the request is sent, however, several additional processing steps may occur. For example, at step 316, appliance 104 optionally performs connection processing to ensure efficient transit of the request to the server(s) and at step 318, appliance 104 optionally makes a load balancing decision to ensure that the request is sent to the most appropriate server(s). Also, in an embodiment, the request is encrypted before it is sent to the server(s) via a back-end encryption process, thereby providing end-to-end network security. At step 320, the request is transmitted to the server(s).

At step 322, appliance 104 receives a response back from one of servers 106*a*-106*n*. If back-end encryption is supported as discussed above, appliance 104 decrypts the response from the server.

At step 324, appliance 104 compresses an object associated with the response from the server. In an embodiment, the object comprises a web object, although the invention is not so limited.

At step 326, the cache management logic in appliance 104 stores the object in the cache in compressed form. The cache management logic is able to store compressed objects in this fashion due to the processing abilities of the present invention. Once the object is stored in the cache, future client requests for the object can be served from the cache without performance of steps 316, 318, 320, 322, 324 and 326 as described above. This is indicated by the line directly connecting decision step 314 to step 328 in flowchart 300.

At step 328, after the object has been received from a server or retrieved from the cache, appliance 104 performs packet processing on the connection to more efficiently service the original client request. At step 330, the response object is then re-encrypted and delivered back to the client.

Each of the processing steps described above occurs at the kernel/OS level of appliance 104. By implementing the cache in the middle of, and integrated with, other processing steps in the kernel/OS space, an embodiment of the present invention is able to bring out additional functionality and improve performance of the cache.

Such integration permits a cache implementation in accordance with an embodiment of the invention to perform additional functions that are traditionally beyond the functional abilities of a cache. For example, an embodiment of the present invention permits the cache to work with encrypted and/or compressed objects.

Another example of additional functionality that may be achieved by an embodiment of the present invention involves the caching of end-to-end encrypted HTTPS traffic. Typically, caches only store unencrypted HTTP responses from servers. Certain caches may in some cases support SSL encrypted HTTPS delivery from the cache to the clients but, in any case, traditional caches are not able to cache responses that have been encrypted by the server and so are unable to support end-to-end (i.e. server to client) encryption. Typically, when a response is encrypted by the server in the form of HTTPS, the cache is not able to decrypt such a response and is therefore unable to store the response in its cache memory. For this reason, traditional caches fail to provide any benefit in the face of end-to-end encrypted traffic. In an embodiment of the present invention, the integrated caching appliance serves as a two-way termination point for the SSL encrypted HTTPS traffic.

For example, in a embodiment of the present invention, the integrated caching appliance acts as a termination point both to encrypted traffic between the server and the appliance, and between the appliance and the clients. In this manner, the appliance is able to decrypt and cache HTTPS-encrypted responses received from servers and when serving such responses to a client, re-encrypt such response and securely deliver it to the requesting client, thereby enabling end-to-end encryption and thus increasing the applicability of caching to a wider variety of web traffic.

In an embodiment of the present invention, the appliance can also serve as an endpoint in an SSL virtual private network (SSL VPN). In particular, the appliance can act as a proxy SSL endpoint for any resource in a private data communication network, decrypting encrypted packets received from a client and then sending them on to the appropriate destination server resource based on address information within the encrypted packets. As described in commonly-owned co-pending U.S. patent application Ser. No. 11/039,946 entitled "System and Method for Establishing a Virtual Private Network," filed on Jan. 24, 2005, the entirety of which is incorporated by reference herein, a data communication session established between client and a gateway may be encrypted with the gateway serving as an encryption endpoint as described in the preceding paragraphs of the present application. As described in the referenced application, the client may use Secure Sockets Layer (SSL), IPSec, or some other encryption method to establish the encrypted data communication session by which an interception mechanism on the client directs traffic to the gateway while making the client browser think it is communicating directly with the destination servers or destination networks. In such an embodiment, the encrypted data communication session can be terminated at the gateway, which also includes an integrated cache as described herein. In this way caching functionality can be integrated into the SSL VPN functionality.

The gateway can also perform any applicable AAA policies to the request and consequently, the gateway will serve cached objects only to appropriately authenticated clients, as well as permitting requests only for users authorized to access a particular cached object. This is possible because the cache is integrated in such a way that the access control policies of the gateway are enforced before the cache sees any particular request. Thus, cached objects get the benefit of access control without the cache itself needing to perform the authentication and authorization.

Through the integration of the cache with such other functions, the cache itself becomes more efficient and more effective at handling the variety of data that passes across today's networks. An embodiment of the present invention also is able to improve the efficiency of the overall network performance by introducing the benefits of cache functionality to a broader array of web traffic.

Some other unique results of the mode of integration described above in accordance with an embodiment of the present invention are as follows. One result is the ability to cache pre-compressed data and serve it to compression-aware clients. Another result is the ability to cache access-controlled data. Yet another result is the ability to work with external caches to provide scalability of the cache. Because the cache is integrated with redirection and traffic management capabilities at the gateway, external caches can be deployed to provide a second-tier of caching thereby extending the capacity (and the benefits) of caching significantly. Through an embodiment of the present invention, this capacity is created without the cache module itself having to explicitly perform cache redirection policies.

In terms of performance, by integrating the cache as described above, the processors of the cache are freed from performing the variety of connection processing tasks that caches, acting as a nodes on a network, are traditionally required to perform, and are thus able to perform its caching functions at their highest performance levels. Indeed, by enabling the caching of compressed data, the cache is able to function even more efficiently and allow users to realize even higher performance.

As previously noted in this application, the efficiency arises as a result of the way the cache is integrated with the other network services and technologies including load balancing technology, encryption, AAA, compression and other types of acceleration and packet processing. As a result, processing duplications and other inefficiencies introduced by traditional modes of integration are avoided. These inefficiencies, caused by unnecessary copying and context switching, arise because each object received by the device must be copied to a message and then into a processor memory prior to processing by the relevant application. The request must then be copied back to the object or packet level for processing by the cache introducing additional memory copies. In contrast, an embodiment of the present invention carries out the integration at the OS or kernel level, thereby enabling the cache to operate on the object as a data structure where the cache has equal status as the other applications and/or processes in relating to and processing such data structure and where the need for such additional memory copies is obviated as all processes are working with the same data structures. The result is a more efficient integration.

C. Caching with Proactive Validation in a Data Communication Network in Accordance with an Embodiment of the Present Invention Because web objects can change over time, each potentially cacheable object is said to have a useful life, or "freshness". The concept of freshness refers to the fact that the application server that originally generated the content also determines the period of time that such object can be served by a cache that may store such object. Caches must be able to determine whether or not the copy of an object stored in its memory is still "fresh," or whether the cache needs to retrieve a new copy of the object from the origin server. An embodiment of the present invention implements a novel approach to assuring object freshness.

Many conventional cache implementations try to keep the cached content fresh by fetching the content from the origin on a pre-determined schedule. The fetching of content from the origin occurs at times established by the cache administrator typically based on one or both of the following approaches: either at (i) regular specified intervals or (ii) when the content is about to expire.

There are two problems typically associated with the above commonly-employed approaches. First, unnecessary processing loads are imposed upon the origin server because that server is required to provide content to the cache requesting the refreshment (whether such refresh occurs at specified intervals or as the content is about to expire) without regard to whether such content will ultimately be served to clients. Second the cache incurs additional processor load based on the extra processing overhead generated because the cache needs to keep track of the elements that must be refreshed and the time at which they have to be refreshed.

A cache in accordance with an embodiment of the present invention solves the above problems using a novel pre-fetching approach. The pre-fetching of the content is not performed in accordance with a predefined schedule or just prior to expiration of the content. Instead, an embodiment of the present invention performs pre-fetching only when both of the following conditions have been met: (1) a client has made a request for the specified content and (2) that content is 'about to expire'.

This approach addresses both problems described above. Pro-active revalidation is more likely to generate a request for refreshing of content from the origin server only where such content is being actively accessed. This minimizes the amount of 'unnecessary' load on the origin server. As discussed above, where the cache requests refreshment of objects that are not ultimately served to clients (or only rarely get served depending on the sensitivity of the cache), the cache is inefficiently utilizing both its own resources as well as the resources of the origin server. An embodiment of the present invention avoids the inefficient use of the cache and server resources by requesting only that content that is being actively accessed. The approach also, for the same reason, reduces the bandwidth used for pre-fetching and therefore makes more efficient use of network resources than traditional approaches.

Furthermore, an embodiment of the present invention uses the expiry information included in the cached object itself to determine whether to request refreshment of the object from the origin server. Such expiry information is typically included in the headers of the relevant object. This embodiment thus avoids the inefficiencies of storing any additional information for fetching unlike many traditional approaches which require the cache to keep a table tracking the schedule for refreshment.

Using a 'demand-based' pre-fetching technique also enhances benefits that are inherent to pre-fetching. This technique reduces the number of cache misses for frequently accessed objects since such objects are very likely to undergo pro-active revalidation, just before they expire. This technique can also prevent the surge of traffic to an origin server that can occur when a large response that is in great demand expires. In the traditional approach, all of the requests for such content miss the cache and get sent to the origin server because the cache content has expired. By contrast, in an embodiment of the present invention, the content of the cache memory will generally be refreshed just prior to expiration and therefore the situation where cache misses occur while the cache is refreshing are much less likely to arise.

In an embodiment of the present invention, the aggressiveness of pre-fetching can be controlled through adjusting the length of the duration before the expiry where the content is determined to be about to expire and also the number of client requests required to trigger refreshment by the cache of the relevant object.

D. Optimizing Processing of Large Non-Cacheable Responses Using "Negative Cells" in Accordance with an Embodiment of the Present Invention In accordance with an embodiment of the present invention, the cache recognizes and does not store objects that are above a specified size in order to improve the object hit ratio. Caches typically have limited memory space devoted to storing cached objects and therefore certain responses that exceed allocated memory space are ultimately rejected as non-cacheable and not stored by the cache. With traditional caches, the cache attempts to store the large response in its cache memory and only aborts storing the response once the cache recognizes that the response size exceeds a predefined maximum size. Traditional caches will repeatedly attempt to cache the large response each time a request for such response is received by the cache from the server. In each case, the cache will need to determine that the object is non-cacheable as exceeding the memory space. Thus, this is a manifestly inefficient approach.

In accordance with an embodiment of the present invention, the cache employs an optimization to avoid expending effort in storing such responses. Whenever the cache detects a response that becomes non-cacheable due to response size, it stores a notation regarding the corresponding request in a data structure termed a "negative cell." The notation indicates that the request is non-cacheable. In the future, when a client requests the same object, the request is matched to the notation regarded the first request stored in the data structure. Based on the match, the cache will not try to cache the response and instead the request will completely bypass the cache.

There is no user configuration required for specifying the duration for which a negative cell should remain in the cache. In fact, the users are not even aware that this particular mechanism is being employed. In an embodiment, the cache uses the regular expiry information that it would have employed to cache the big response, to cache the "negative information" about that response.

E. Exemplary Computer System-Based Implementation

The functions of the present invention may be implemented using hardware, software, or a combination thereof and may be implemented in one or more computer systems or other processing systems. For example, FIG. 4 depicts an example computer system 400 that may be utilized to implement a the functions of the present invention.

Figure 4:
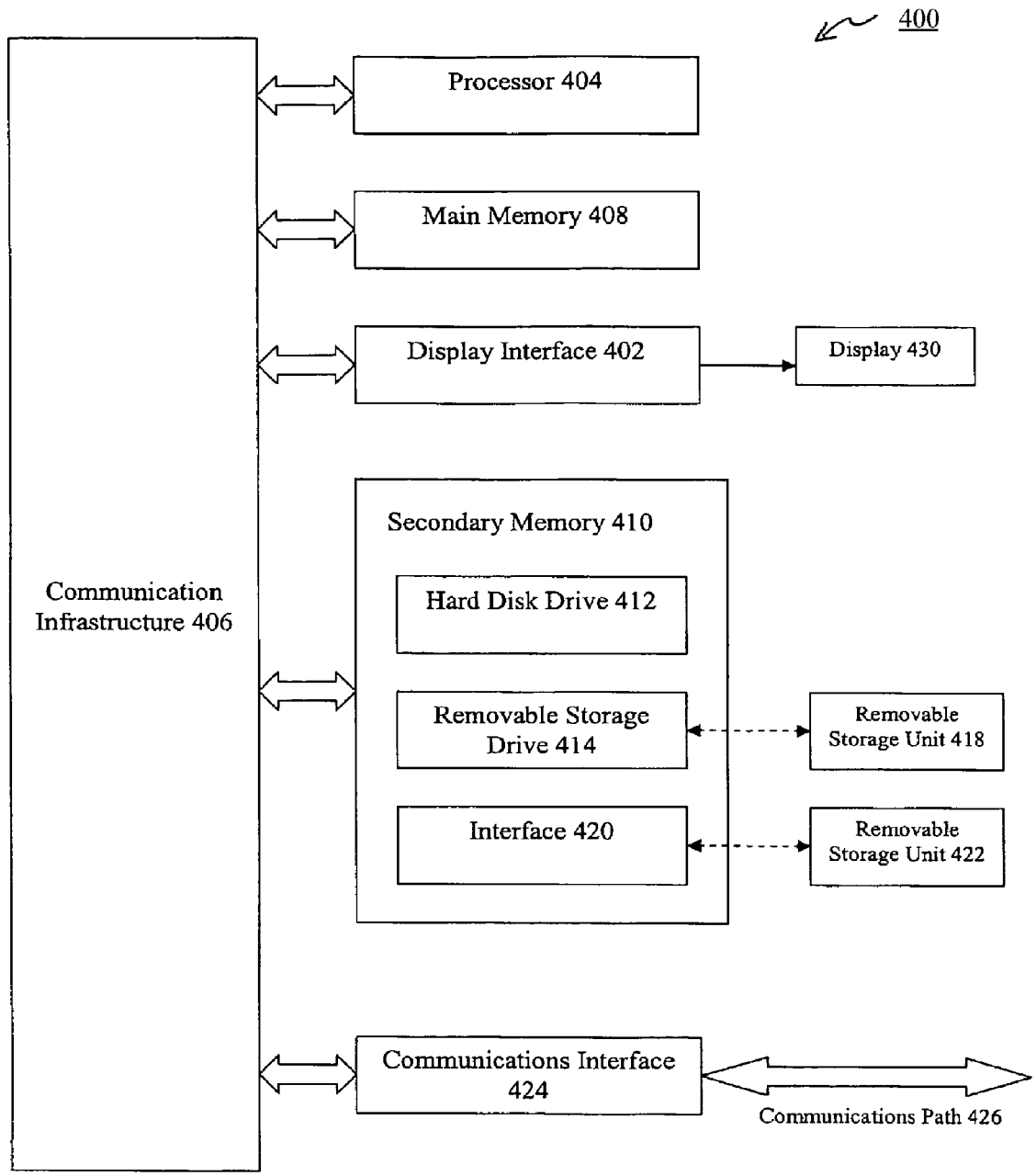
FIG. 4 illustrates an example computer system-based implementation for performing caching functions in accordance with embodiments of the present invention.

As shown in FIG. 4, the example computer system 400 includes a processor 404 for executing software routines in accordance with embodiments of the present invention. Although a single processor is shown for the sake of clarity, the computer system 400 may also comprise a multi-processor system. The processor 404 is connected to a communication infrastructure 406 for communication with other components of the computer system 400. The communication infrastructure 406 may comprise, for example, a communications bus, cross-bar, or network.

Computer system 400 further includes a main memory 408, such as a random access memory (RAM), and a secondary memory 410. The secondary memory 410 may include, for example, a hard disk drive 412 and/or a removable storage drive 414, which may comprise a floppy disk drive, a magnetic tape drive, an optical disk drive, or the like. The removable storage drive 414 reads from and/or writes to a removable storage unit 418 in a well known manner. Removable storage unit 418 may comprise a floppy disk, magnetic tape, optical disk, or the like, which is read by and written to by removable storage drive 414. As will be appreciated by persons skilled in the relevant art(s), the removable storage unit 418 includes a computer usable storage medium having stored therein computer software and/or data.

In alternative embodiments, secondary memory 410 may include other similar means for allowing computer programs or other instructions to be loaded into computer system 400. Such means can include, for example, a removable storage unit 422 and an interface 420. Examples of a removable storage unit 422 and interface 420 include a program cartridge and cartridge interface (such as that found in video game console devices), a removable memory chip (such as an EPROM, or PROM) and associated socket, and other removable storage units 422 and interfaces 420 which allow software and data to be transferred from the removable storage unit 422 to computer system 400.

Computer system 400 further includes a display interface 402 that forwards graphics, text, and other data from the communication infrastructure 406 or from a frame buffer (not shown) for display to a user on a display unit 430.

Computer system 400 also includes at least one communication interface 424. Communication interface 424 allows software and data to be transferred between computer system 400 and external devices via a communication path 426. In embodiments of the present invention, the communication interface 424 permits data to be transferred between the computer system 400 and a data communication network, such as a public data or private data communication network. Examples of communications interface 424 can include a modem, a network interface (such as Ethernet card), a communications port, and the like. Software and data transferred via communications interface 424 are in the form of signals which can be electronic, electromagnetic, optical or other signals capable of being received by communications interface 424. These signals are provided to the communications interface via the communication path 426.

As used herein, the term "computer program product" may refer, in part, to removable storage unit 418, removable storage unit 422, a hard disk installed in hard disk drive 412, or a carrier wave carrying software over a communication path 426 (wireless link or cable) to communication interface 424. A computer useable medium can include magnetic media, optical media, or other recordable media, or media that transmits a carrier wave or other signal. These computer program products are means for providing software to computer system 400.

Computer programs (also called computer control logic) are stored in main memory 408 and/or secondary memory 410. Computer programs can also be received via communications interface 424. Such computer programs, when executed, enable the computer system 400 to perform one or more features of the present invention as discussed herein. In particular, the computer programs, when executed, enable the processor 404 to perform features of the present invention. Accordingly, such computer programs represent controllers of the computer system 400.

The present invention can be implemented as control logic in software, firmware, hardware or any combination thereof. In an embodiment where the invention is implemented using software, the software may be stored in a computer program product and loaded into computer system 400 using removable storage drive 414, hard disk drive 412, or interface 420. Alternatively, the computer program product may be downloaded to computer system 400 over communications path 426. The software, when executed by the processor 404, causes the processor 404 to perform functions of the invention as described herein.

G. Conclusion

While various embodiments of the present invention have been described above, it should be understood that they have been presented by way of example only, and not limitation. Thus, it will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for performing integrated caching at a kernel level of an operating system to more efficiently process network communications comprising the steps of:
 (a) receiving, by a packet engine of an appliance in communication with a cache of the appliance at a kernel level, an encrypted response from a server to a request of a client, the encrypted response providing an object, the packet engine operating at the kernel level of an operating system of the appliance and providing the object as a kernel level data structure of the packet engine stored in memory of kernel space;
 (b) decrypting, by an Secure Socket Layer (SSL) engine of the appliance, the encrypted response from the same kernel level data structure of the packet engine stored in memory to provide a decrypted response, the SSL engine in communication with the packet engine and operating at the kernel level;
 (c) storing, by a cache management logic of the appliance, the object of the decrypted response in a cache, the cache management logic in communication with the packet engine and operating at the kernel level, the cache management logic operating on the object from the same kernel level data structure of the packet engine stored in memory accessed by one of the packet engine or the SSL engine;
 (d) determining, by a policy engine of the appliance, the client is authorized to access the object identified by the decrypted request, the policy engine in communication with the packet engine and operating at the kernel level;
 (e) transmitting, by the packet engine, one of the encrypted response or the decrypted response to the client.

2. The method of claim 1, comprising the steps of:
 (f) receiving, by the packet engine, an encrypted request from the client for the object; and
 (g) decrypting, by the SSL engine, the encrypted request to provide a decrypted request.

3. The method of claim 2, comprising the steps of:
 (h) determining, by the cache management logic, via the decrypted request that the encrypted request identifies the object stored in the cache;
 (i) encrypting, by the SSL engine, a response having the object stored in the cache; and
 (j) transmitting, by the packet engine, the encrypted response to the client in response to the encrypted request.

4. The method of claim 1, comprising receiving a second request for the object from a second client and determining, by the policy engine, the second client is not authorized to access the object identified by the decrypted request, and the appliance not processing the second request via the cache management logic in response to the determination.

5. The method of claim 1, comprising the steps determining, by the cache management logic, via the decrypted request that the encrypted request identifies the object stored in the cache, and transmitting, by the appliance, the object to the client.

6. The method of claim 1, wherein step (c) comprises compressing, by a compression logic of the appliance, the object of the decrypted response to provide a compressed object, and the cache management logic storing the compressed object in the cache, the compression logic operating at a kernel level of the operating system of the appliance.

7. The method of claim 6, comprising operating, by the compression logic, on the object using the same kernel level data structure of the packet engine accessed by one of the packet engine or the SSL engine.

8. The method of claim 1, wherein step (d) comprises encrypting, by the SSL engine, the decrypted response, and transmitting, by the packet engine, the response encrypted by the SSL engine to the client.

9. An appliance for performing integrated caching at a kernel level of an operating system to more efficiently process network communications, the appliance comprising a packet engine in communication with a cache at the kernel level, the appliance comprising:
   a hardware processor coupled to a memory, the hardware processor executing a packet engine, an Secure Socket Layer (SSL) engine, and a cache management logic, and a policy engine, and wherein:
   the packet engine is configured for receiving an encrypted response from a server to a request of a client, the encrypted response providing an object, the packet engine operating at a kernel level of the operating system of the appliance and providing the object as a kernel level data structure of the packet engine stored in a kernel space of the memory;
   the SSL engine is configured for decrypting the encrypted response via the same kernel level data structure of the packet engine stored in the kernel space of the memory to provide a decrypted response, the SSL engine in communication with the packet engine and operating at the kernel level;
   the cache management logic is configured for storing the object of the decrypted response in a cache, the cache management logic in communication with the packet engine and operating at the kernel level, the cache management logic operating on the object from the same kernel level data structure of the packet engine stored in the kernel space of the memory accessed by one of the packet engine or the SSL engine;
   wherein the policy engine is configured for determining the client is authorized to access the object identified by the decrypted request, the policy engine in communication with the packet engine and operating at the kernel level; and
   wherein the packet engine is further configured for transmitting one of the encrypted response or the decrypted response to the client.

10. The appliance of claim 9, wherein the packet engine is further configured for receiving an encrypted request from the client for the object and the SSL engine is further configured for decrypting the encrypted request.

11. The appliance of claim 9, wherein the cache management logic is further configured for determining via the decrypted request that the encrypted request identifies the object stored in the cache; the SSL engine is further configured for encrypting a response having the object stored in the cache; and the packet engine is further configured for transmitting the encrypted response to the client in response to the encrypted request.

12. The appliance of claim 9, wherein the processor further executes a policy engine configured for determining the client is not authorized to access the object identified by the decrypted request, the policy engine in communication with the packet engine and operating at the kernel level and the appliance not processing the decrypted request via the cache management logic in response to the determination.

13. The appliance of claim 9, wherein the cache management logic is further configured for determining using the decrypted request that the encrypted request identifies the object stored in the cache, and the packet engine is further configured for transmitting the object to the client.

14. The appliance of claim 9, wherein the processor further executes a compression logic configured for compressing the object of the decrypted response, the compression logic operating at a kernel level of the operating system of the appliance and wherein the cache management logic stores the compressed object to the cache.

15. The appliance of claim 14, wherein the compression logic is further configured for operating on the object using the same kernel level data structure of the packet engine accessed by one of the packet engine or the SSL engine.

16. The appliance of claim 9, wherein the SSL engine is further configured for encrypting the decrypted response and the packet engine is further configured for transmitting the response encrypted by the SSL engine to the client.

17. A method for performing integrated decryption, authentication and authorization at a kernel level of an operating system to more efficiently process network communications comprising the steps of:
   (a) receiving, by a packet engine of an appliance in communication with a policy engine and an Secure Socket Layer (SSL) engine of the appliance at the kernel level, an encrypted request from a client to a server, the encrypted request requesting access to an object, the packet engine operating at a kernel level of the operating system of the appliance and providing the object as a kernel level data structure of the packet engine stored in memory of kernel space;
   (b) decrypting, by the SSL engine of the appliance, the encrypted request from the same kernel level data structure of the packet engine stored in memory to provide a decrypted request, the SSL engine in communication with the packet engine and operating at the kernel level;
   (c) authenticating, by the policy engine of the appliance, the client, the policy engine in communication with the packet engine and operating at the kernel level;
   (d) determining, by the policy engine, a user of the client is authorized to access the object identified by the decrypted request, the policy engine operating on the object via the same kernel level data structure of the packet engine stored in memory; and
   (e) determining, by a cache management logic of the appliance, that the object identified by the decrypted request is stored in cache, the cache management logic in communication with the packet engine and operating at the kernel level, the cache management logic identifying the object using the same kernel level data structure of the packet engine accessed by one of the packet engine or the policy engine; and (f) transmitting, by the packet engine, to the client in response to the encrypted request a response encrypted by the SSL engine and having the object stored in the cache.

18. The method of claim 17, comprising a step of:

(g) determining, by a cache management logic of the appliance, that the object identified by the decrypted request is not stored in cache, the cache management logic in communication with the packet engine and operating at the kernel level, the cache management logic identifying the object using the data structure accessed by one of the packet engine or the policy engine; and (h) transmitting, by the packet engine, the decrypted request to the server.

19. A method for performing integrated caching and compression at a kernel level of an operating system to more efficiently process network communications comprising the steps of:

(a) receiving, by a packet engine of an appliance in communication with a cache, compression logic, and an Secure Socket Layer (SSL) engine of the appliance at the kernel level, an encrypted response from a server to a request of a client, the response providing an object, the packet engine operating at a kernel level of the operating system of the appliance and providing the object as a kernel level data structure stored in memory of kernel space, the encrypted response decrypted by the SSL engine of the appliance via the same kernel level data structure of the packet engine;

(b) compressing, by the compression logic of the appliance, the object of the response, the compression logic operating at a kernel level of the operating system of the appliance to provide a compressed object, and accessing the object via the same kernel level data structure of the packet engine stored in memory;

(c) storing, by the cache management logic of the appliance, the compressed object of the response in a cache, the cache management logic in communication with the packet engine and operating at the kernel level, the cache management logic operating on the object using the same kernel level data structure of the packet engine stored in memory accessed by one of the packet engine or the compression logic;

(d) determining, by a policy engine of the appliance, the client is authorized to access the object identified by the decrypted request, the policy engine in communication with the packet engine and operating at the kernel level; and (e) transmitting, by the packet engine, the response to the client.

20. The method of claim 19, comprising receiving, by the packet engine, a second request for the object, determining, by the cache management logic, the object is stored compressed in the cache, and transmitting, by the packet engine, the compressed object in response to the second request.

21. A method for performing integrated caching at a kernel level of an operating system to more efficiently process network communications, the method comprising the steps of:

(a) receiving, by a packet engine of an appliance deployed between a client and a server, an encrypted response from the server to a request of the client, the encrypted response comprising an object, the packet engine operating at a kernel level of a kernel of an operating system of the appliance;

(b) providing, from a kernel level data structure stored in memory of kernel space, the object for each of the packet engine, an Secure Socket Layer (SSL) engine of the appliance and a cache management logic of the appliance, each of the packet engine, the SSL engine and the cache management logic accessing the object within the same kernel level data structure in the kernel space without using a service call, each of the packet engine, the SSL engine and the cache management logic having an equal status to access the object via the kernel level data structure stored in memory;

(c) decrypting, by the SSL engine, the encrypted response from the same kernel level data structure stored in memory and without using a service call to access the kernel, the SSL engine in communication with the packet engine and operating at the kernel level;

(d) storing, by a cache management logic of the appliance, the encrypted object from the encrypted response in a cache, the cache management logic in communication with the packet engine and operating on the object from the same kernel level data structure stored in memory and without using a service call to access the kernel;

(e) determining, by a policy engine of the appliance, the client is authorized to access the object identified by the decrypted request, the policy engine in communication with the packet engine and operating at the kernel level; and (f) transmitting, by the packet engine, one of the encrypted response or the decrypted response to the client.

* * * * *

UNITED STATES PATENT AND TRADEMARK OFFICE
CERTIFICATE OF CORRECTION

PATENT NO. : 8,739,274 B2
APPLICATION NO. : 11/169002
DATED : May 27, 2014
INVENTOR(S) : Khemani et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 76 days.

Signed and Sealed this
Twenty-second Day of March, 2016

Michelle K. Lee
*Director of the United States Patent and Trademark Office*